United States Patent

Lambert

(10) Patent No.: US 7,509,421 B2
(45) Date of Patent: Mar. 24, 2009

(54) DIGITAL RIGHTS MANAGEMENT

(75) Inventor: Martin R. Lambert, Twyford (GB)

(73) Assignee: SealedMedia Limited, Buckinghamshire (GB)

( * ) Notice: Subject to any disclaimer, the term of this patent is extended or adjusted under 35 U.S.C. 154(b) by 476 days.

(21) Appl. No.: 10/048,790

(22) PCT Filed: Jun. 5, 2001

(86) PCT No.: PCT/GB01/02486

§ 371 (c)(1),
(2), (4) Date: Feb. 5, 2002

(87) PCT Pub. No.: WO01/95175

PCT Pub. Date: Dec. 13, 2001

(65) Prior Publication Data

US 2004/0044779 A1    Mar. 4, 2004

(30) Foreign Application Priority Data

Jun. 5, 2000  (GB) ................................. 0013682.0
Jun. 13, 2000 (GB) ................................. 0014430.3

(51) Int. Cl.
*G06F 15/173* (2006.01)
*G06F 15/16* (2006.01)

(52) U.S. Cl. .................. 709/226; 709/217; 709/219; 709/225

(58) Field of Classification Search ............... 709/203, 709/217, 219, 225, 226
See application file for complete search history.

(56) References Cited

U.S. PATENT DOCUMENTS

| 5,629,980 | A |   | 5/1997  | Stefik et al.           |
|-----------|---|---|---------|-------------------------|
| 5,638,443 | A | * | 6/1997  | Stefik et al. ... 705/54 |
| 5,845,281 | A |   | 12/1998 | Benson et al.           |
| 5,910,987 | A |   | 6/1999  | Ginter et al.           |
| 5,915,019 | A |   | 6/1999  | Ginter et al.           |
| 5,917,912 | A |   | 6/1999  | Ginter et al.           |
| 5,920,861 | A |   | 7/1999  | Hall et al.             |
| 5,940,504 | A |   | 8/1999  | Griswold                |
| 5,943,422 | A |   | 8/1999  | Van Wie et al.          |
| 5,949,876 | A |   | 9/1999  | Ginter et al.           |
| 5,982,891 | A |   | 11/1999 | Ginter et al.           |
| 6,112,181 | A |   | 8/2000  | Shear et al.            |
| 6,138,119 | A |   | 10/2000 | Hall et al.             |
| 6,185,683 | B1 |  | 2/2001  | Ginter et al.           |
| 6,189,146 | B1 | * | 2/2001 | Misra et al. ... 717/177 |

(Continued)

FOREIGN PATENT DOCUMENTS

WO          WO00/58810        10/2000

(Continued)

OTHER PUBLICATIONS

The European Search Report dated Nov. 28, 2001, issued in the corresponding European Application No. EP 01 30 4164.

*Primary Examiner*—Ario Etienne
*Assistant Examiner*—Hussein Elchanti
(74) *Attorney, Agent, or Firm*—Townsend and Townsend and Crew LLP

(57) ABSTRACT

A digital rights management (DRM) system distributes the storage of rights and/or the rights management decision making process between a DRM client and DRM server, in order to overcome the shortcomings inherent in exclusively client-side or exclusively server-side DRM systems.

10 Claims, 16 Drawing Sheets

U.S. PATENT DOCUMENTS

| | | |
|---|---|---|
| 6,236,971 B1 | 5/2001 | Stefik et al. |
| 6,237,786 B1 | 5/2001 | Ginter et al. |
| 6,240,185 B1 | 5/2001 | Van Wie et al. |
| 6,253,193 B1 | 6/2001 | Ginter et al. |
| 6,385,614 B1 * | 5/2002 | Vellandi .................. 707/9 |
| 6,385,726 B1 * | 5/2002 | Hasebe et al. ............... 713/182 |
| 6,453,305 B1 * | 9/2002 | Glassman et al. ............. 705/59 |
| 6,560,651 B2 * | 5/2003 | Katz et al. .................. 709/229 |
| 6,636,966 B1 * | 10/2003 | Lee et al. ................... 713/165 |
| 6,944,776 B1 * | 9/2005 | Lockhart et al. ............. 705/59 |
| 2001/0011253 A1 * | 8/2001 | Coley et al. .................. 705/59 |
| 2001/0023417 A1 | 9/2001 | Stefik et al. |
| 2002/0049679 A1 | 4/2002 | Russell et al. |

FOREIGN PATENT DOCUMENTS

| | | |
|---|---|---|
| WO | WO00/59151 | 10/2000 |
| WO | WO00/62265 | 10/2000 |
| WO | WO01/44907 | 6/2001 |
| WO | WO01/75562 | 10/2001 |

\* cited by examiner

Fig. 3. CLIENT-SIDE RIGHTS MANAGEMENT (PRIOR ART)

DISTRIBUTED RIGHTS STORAGE (AND PROGRESSIVE CACHING)

EXAMPLE SCENARIO OF DISTRIBUTED RIGHTS MANAGEMENT

DISTRIBUTED RIGHTS LOGGING

DRM BUREAU SERVICE CONCEPTS

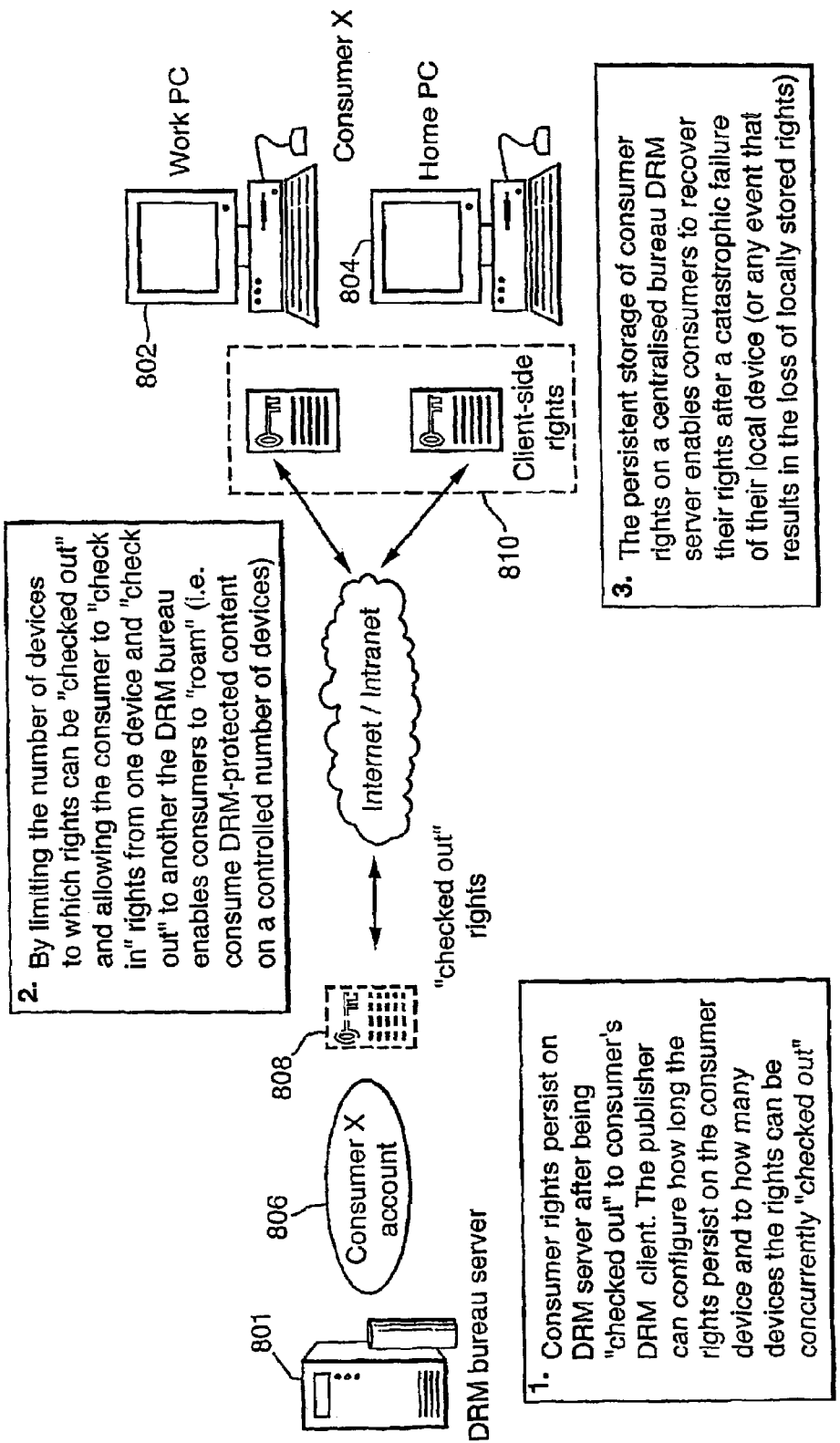

Fig.9.
RIGHTS BOUTIQUE

1. Publisher configures rights templates via online forms, optionally based on pre-configured bureau templates. When consumers purchase rights the publisher's templates are used to create rights instantiations for the consumer (optionally stored in the consumer's bureau account)

2. Publisher uses online service (e.g. web browser, HTTP, CGI/BIN, etc.) to configure "virtual" products and/or rights

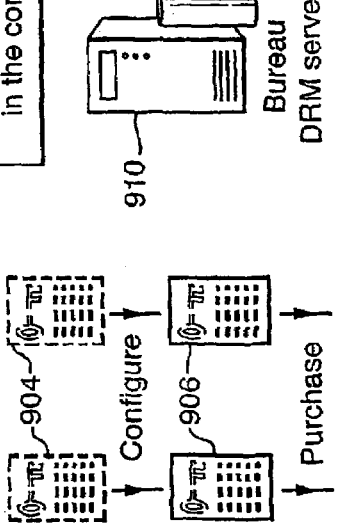
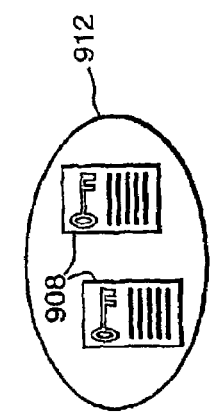

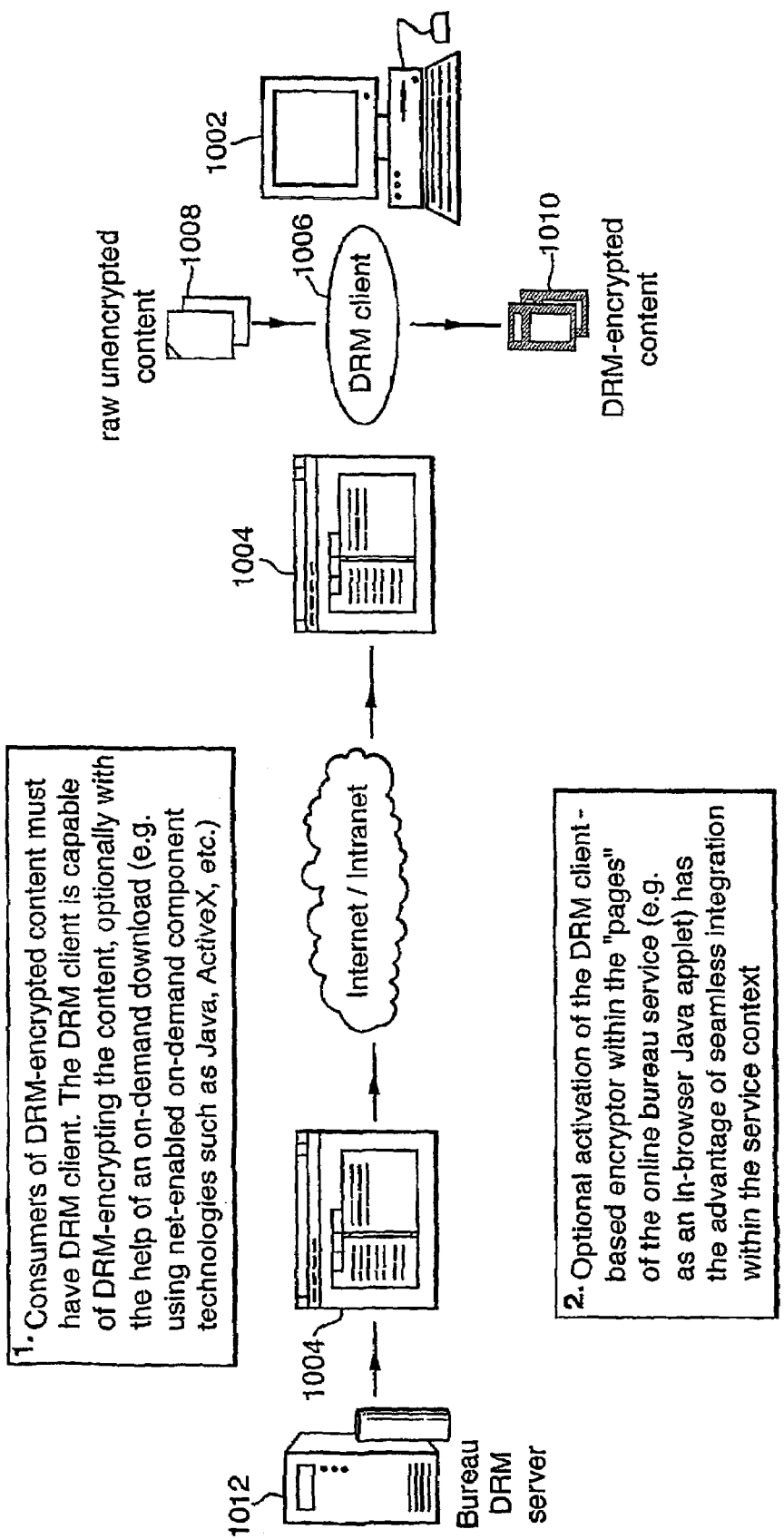

Fig. 11.
LOAD-BASED PRICING
Fig. 11A.
Maintained accounts
* in a specified accounting period
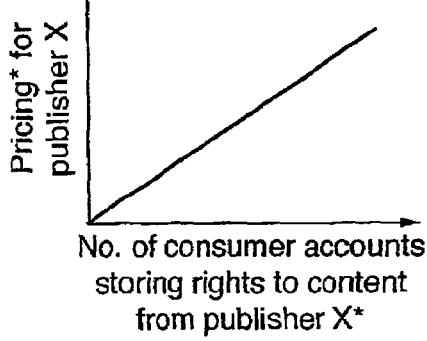
Fig. 11A-1.
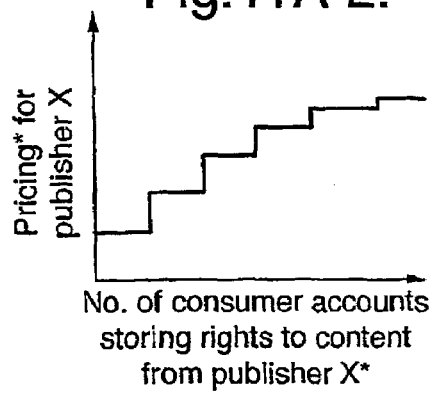
Fig. 11A-2.
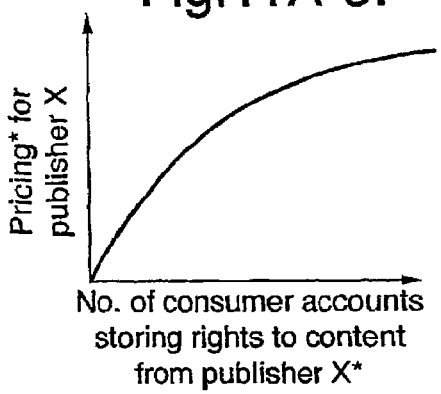
Fig. 11A-3.
Fig. 11B.
Consumer activity
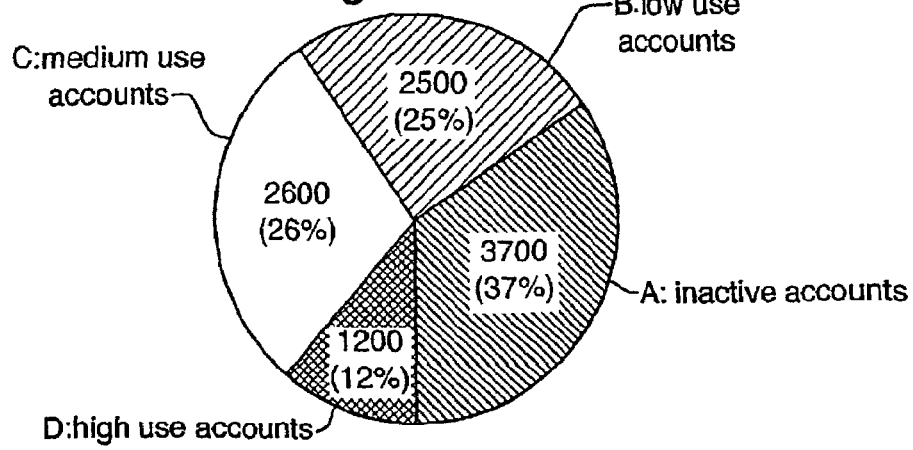
Fig. 11B-1.
- B: low use accounts — 2500 (25%)
- C: medium use accounts — 2600 (26%)
- A: inactive accounts — 3700 (37%)
- D: high use accounts — 1200 (12%)

Fig.11. (cont.)
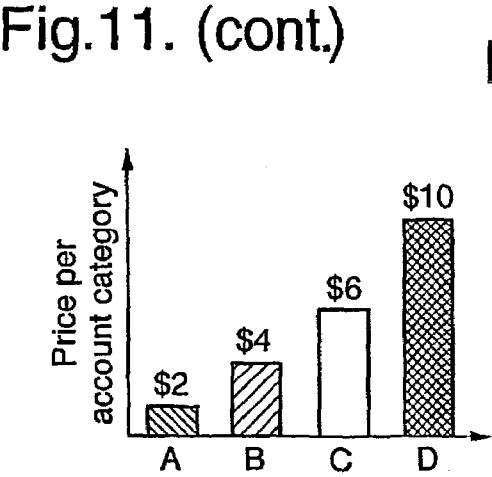
Fig.11B-2.
price* = 3700 x $2
+ 2500 x $4
+ 2600 x $6
+ 1200 x $10
for accounts storing rights to content for publisher X
* in a specified accounting period
Fig.11C.
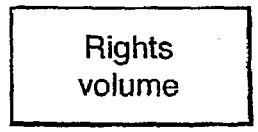
Fig.11C-1.
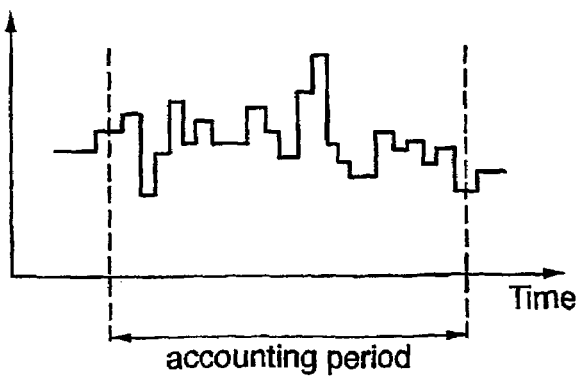
Cumulative "volume" of rights stored across all consumer accounts for content from publisher X

Fig.12.
REVENUE-BASED PRICING
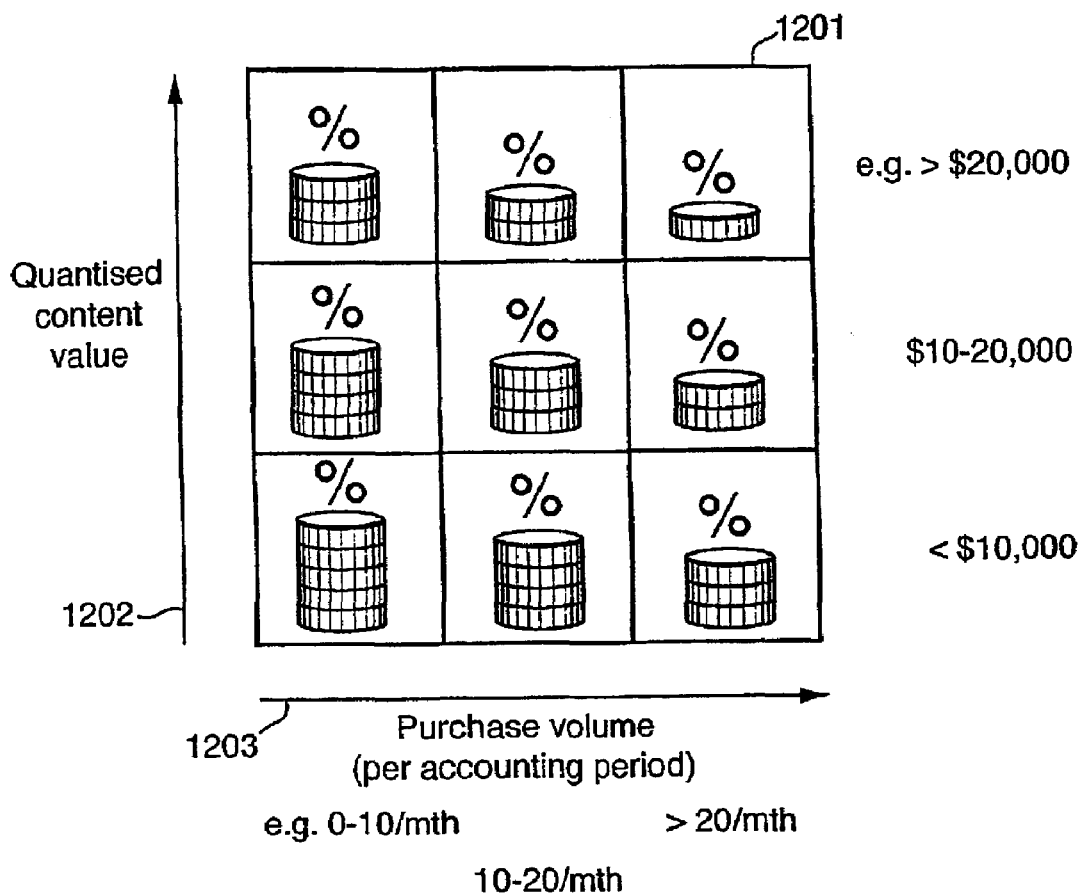
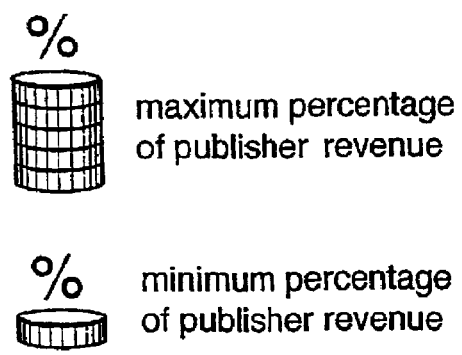

REVENUE-BASED + LOAD-BASED FLOOR

▦ = revenue-based pricing

☐ = load-based pricing

▨ = maximum of revenue-based or load-based pricing in a given accounting period. This is the actual price charged to the relevant publisher.

LOGGING-BASED BUREAU AFFILIATE PROGRAM

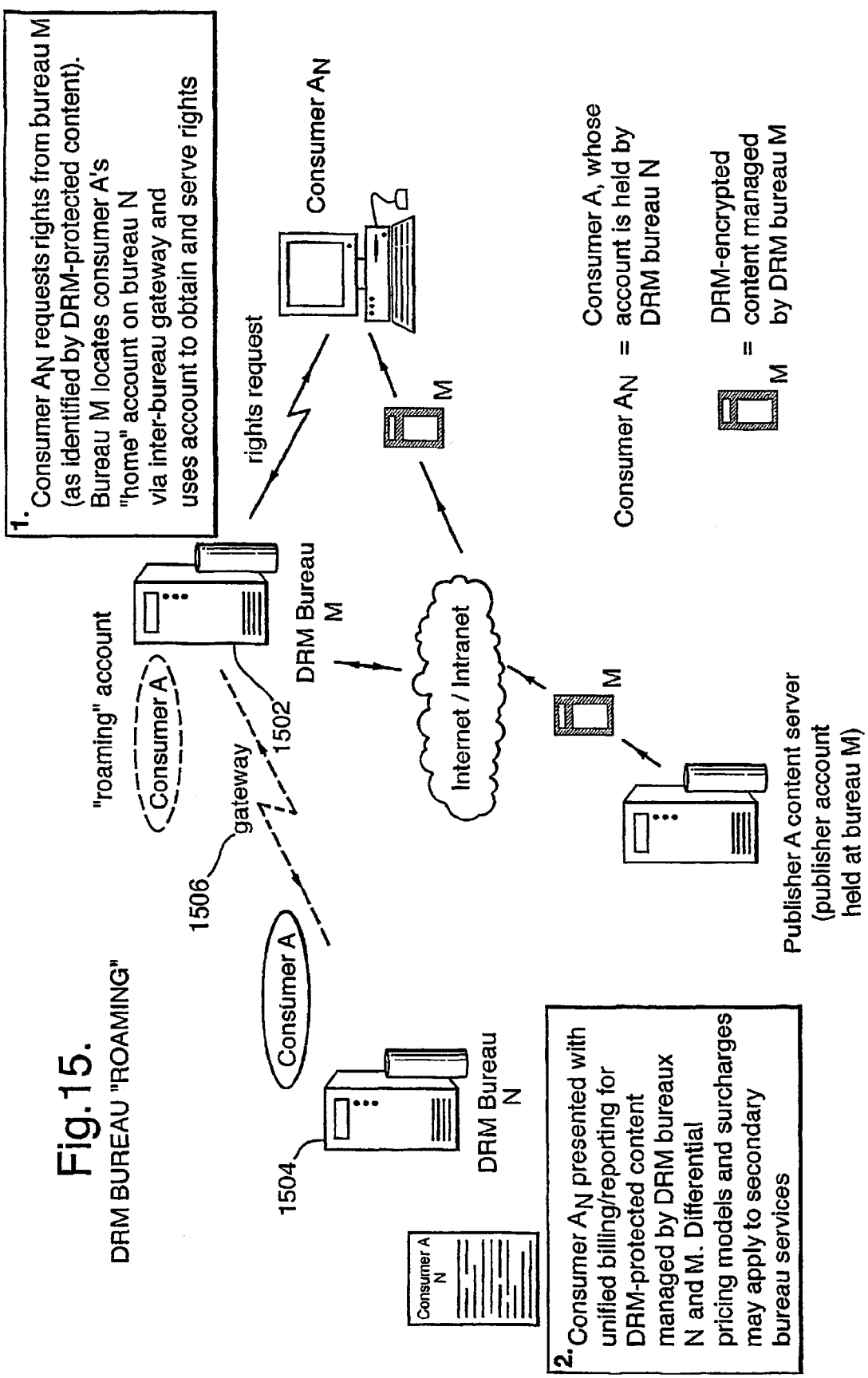

DIGITAL RIGHTS MANAGEMENT

This application is the National Phase of International Application PCT/GB01/02486 filed Jun. 5, 2001, which designated the U.S. and that International Application was published under PCT Article 21(2) in English.

The present invention is generally in the field of digital rights management (DRM).

In one aspect, the present invention relates to a DRM "bureau" server which can, according to the embodiment, be used in many different ways. In one particular embodiment, the present invention relates to a system that distributes the storage of rights and/or the rights management decision making process between a DRM client and a DRM server, in order to overcome the shortcomings inherent in exclusively client-side or exclusively server-side DRM systems. In another embodiment, the present invention relates to a system which manages rights to content on behalf of plural publishers.

If there is to be a viable commerce based upon the electronic distribution of valuable multimedia content (such as for example reports, images, music tracks, videos, etc.), then there must be some means of enforcing and retaining copyright control over the electronic content. There is now emerging a set of hardware and software solutions, generically known as digital rights management (DRM) solutions, that aim to provide this copyright control while, to a varying degree, also enabling new commercial methods suited to the Internet and electronic delivery. Common to virtually all these solutions is the requirement that the multimedia content be distributed within a persistent tamperproof encryption wrapper (the idea being that a million copies of encrypted content is no more valuable than one). Very simply, DRM works by carefully providing the consumers of this encrypted content with secret decryption keys that provide temporary access to the content for some controlled purpose, e.g. viewing, printing, playing, etc., without ever providing access to the raw decrypted content that could be used for unauthorised reuse or redistribution.

FIG. 1 illustrates schematically an overview of how typical DRM systems work. Referring to FIG. 1, a "publisher" of digital content seals their digital content, buffers or streams within a layer of encryption and digital signatures into a DRM-encrypted content format 102. The encryption makes it difficult for malicious consumers to obtain access to the raw decrypted content (and make unauthorised copies for redistribution). The digital signatures prevent malicious consumers from tampering with the encrypted content (perhaps to pass off the content as their own) by enabling the DRM system to detect the smallest change to the encrypted content. The DRM-encrypted content 102 can then be delivered to consumers via any electronic distribution medium 104, e.g. Web, ftp, e-mail, CD-ROM, etc. The publisher need not worry about protecting the DRM-encrypted content 102 in transit to the consumer since it is inherently protected by its encryption layer and digital signatures.

Less sophisticated DRM systems sometimes bundle individual consumer access rights with the content, either within the encryption layer or at least protected by the digital signatures. The advantage of bundling rights with the content is that the consumer can obtain both the content and the rights at the same time. Disadvantages include extreme inflexibility in the rights management policies that can be implemented and an enormous versioning problem (since there needs to be a separate version of the encrypted content 102 for each consumer and a new version of the encrypted content whenever the rights change).

More sophisticated DRM systems deliver the rights separately from the content (from a DRM server 108). The rights are encoded in some electronic format 110 (i.e. electronic "rights") and specify the permitted relationship between consumers and DRM-encrypted content sets (and subsets), e.g. which content the consumer can access, what they are permitted to do with it (e.g. printing), and for how long.

A specialised viewer (the DRM client 106) resident on the consumer device is required to obtain, manage and interpret the rights, temporarily decrypt the encrypted content and view/play it within a secure environment (so that the consumer cannot obtain access to the raw decrypted content or the decryption keys) subject to the restrictions implied by the consumer's rights (e.g. view but do not print a document). The DRM server 108 is responsible for issuing rights to requesting DRM clients 106. Current DRM systems typically issue rights to authenticated consumers at the time of purchase (or grant) and the rights are transferred to permanent storage on the consumer device 106. The DRM server 108 plays no further role in the ongoing use of those rights.

In general, "content sets" can be thought of as a related set of one or more digital content, buffers or streams. In general, "rights" can be thought of as an electronic description (explicit or by implication) of the association between consumers (or consumer devices) and DRM-protected content sets. Rights can optionally specify means of identifying the consumer (or consumer device) to which the rights 'belong'; means of identifying the content sets and subsets to which the rights apply; encryption keys and checksums (cryptographic or otherwise); and, the specific access rights granted to the consumers (and/or their consumer devices) over those content sets (e.g. whether or not the consumer can print a document, the duration of access, etc.). Rights can be encoded in any machine-readable form (e.g. parsable languages, specialised data structures, etc.) and are used internally by the DRM system to grant, deny or meter consumer access to encrypted content. In general, "node locks" can be thought of as rights that are tied to a particular consumer device or "node", i.e. rights that will only provide access to DRM-encrypted content on one particular consumer device.

It is preferable for a DRM system to issue rights to a consumer for the shortest possible time: the rights are preferably issued at the time the consumer actually attempts to access the encrypted content and preferably removed from the consumer device as soon thereafter as possible. In preferred implementations, this requires that the rights are stored on a remote server hosted on a network (e.g., the Internet or an intranet). The consumer identifies herself to the local DRM system that transparently opens network connections to the remote server to obtain the rights which are then used to decrypt and access the encrypted content.

It is useful to examine the historical progression of digital rights management. Digital rights management has historically proceeded from off-line contractual agreements, to server-side rights management systems, and then to client-side rights management systems.

With off-line contractual agreements (which in practice provide no rights management at all), a publisher requires its content consumers to accept a legally binding agreement governing the use of the publisher's digital content before the consumer is provided with the digital content. The difficulty of detecting subsequent abuse (i.e. unauthorised duplication and redistribution), the scale and ease with which net-enabled consumers can now abuse that content, and the practical difficulties of taking legal action against thousands of non-compliant consumers, many of whom may be in different legal jurisdictions, means that off-line contractual agreements are increasingly only useful as a backup to technological means of enforcing copyright and use rights.

Next in the progression of rights management is server-side digital rights management. An overview of server-side digital rights management is illustrated schematically in FIG. 4. A publisher provides controlled access to its digital content 204 via one or more centralised servers 202 (e.g. Web servers). A consumer 210 connects via a network 212 (such as the Internet) to the publisher's servers 202 to locate, download and view digital content 204. Typically, the consumer 210 must provide a username and password to an authentication mechanism 214 that has been issued to the consumer by the server-side rights management system running on the publisher server 202. The basic idea is that unauthorised consumers cannot download content from the publisher's server(s) to which the publisher has not granted them access. Many publishers have spent millions of dollars developing sophisticated server-side content repositories capable of providing fine-grained control over which digital content files/buffers can be served to identified consumers.

Unfortunately, server-side rights management suffers from a number of fundamental shortcomings that render it relatively ineffective in practice. First, almost all the Internet protocols by which consumers download or otherwise obtain digital content from publishers require that the content be transmitted to the consumer's device in open and standard formats (such as HTML, PDF, MP3, etc.) so that the consumer's device can render/play that content without requiring a specialised viewer/player for each publisher's content. This means that once the consumer has identified themselves to the publisher and obtained the content, nothing prevents that consumer from redistributing that content (such illicitly redistributed content is designated by reference numeral 216 in FIG. 4) to another consumer 220. What this means is that the publisher has completely lost control over its content.

Furthermore, nothing prevents the consumer 210 from sharing their authentication details (e.g. username and password) 218 with another consumer 220 who can then impersonate the original consumer 210 and obtain access to the publisher's content free of charge. In fact, this practice is very common. The relatively poor logging information available to the publisher's server 202 (e.g., the difficulty of distinguishing between client IP addresses and firewall IP addresses) makes it extremely difficult to detect this form of abuse.

In addition, because server-side rights management by definition exerts no control over what happens to the content once it reaches the client-side, server-side rights management cannot be used to manage inherently client-side rights, such as whether or not a consumer is allowed to print a document.

The requirement for publishers to retain control over their content after it has left their server/site led to the development of client-side rights management systems (e.g. the DRM solution embedded in early versions of Microsoft's Windows Media Player). FIG. 3 illustrates schematically an overview of a purely client-side rights management system. In particular, client-side rights management systems generally use some form of encryption to convert digital content into an encrypted form 304 that is not immediately useful to a consumer 310 (so that unauthorised redistribution of the encrypted content by a consumer 310 to another consumer 320 is no longer a problem). In order for the authorised consumer 310 to obtain access to the useful, decrypted content they are issued with the decryption keys 306, usually in return for payment. Considerable effort is devoted by client-side rights management systems to prevent the consumer from directly accessing either the decryption keys 306 or the decrypted content (either of which would enable the authorised consumer 310 to bypass the client-side security and redistribute the decrypted content to another consumer 320). In addition to decrypting the content, the client-side rights management can often also enforce various access policies such as locking the content to a specific consumer device ("node-locking"), expiring access to the content after a certain time, etc.

This approach is known as client-side rights management since: it requires the presence of specialised client-side hardware or software (i.e. hardware or software installed on the consumer's computer, designated generically in FIG. 3 as "DRM client 312") to perform the temporary client-side decryption and to provide a secure viewing environment on device of an authorised consumer 310 without exposing the decrypted content or the decryption keys to the consumer; the rights (i.e. what the consumer 310 is entitled to do with the encrypted content) are kept in storage 314 at the client-side (i.e. on the consumer's computer); the rights management decisions (i.e. what the consumer is allowed to do with the encrypted content) are taken exclusively at the client-side 310 (as they must be, given that this is where the rights reside).

Whilst client-side rights management is a significant improvement over server-side rights management, it still suffers from a number of serious drawbacks. For example, storing rights on the client makes it the consumer's responsibility to maintain those rights (and protect them against loss). As a result, it is the consumer's problem when those rights are lost (for example due to a catastrophic failure of the consumer's device). When one imagines the consequences of losing rights that may have been progressively acquired over a long period, and when one also reflects on the relative unreliability and short lifetimes of modern computing devices, this shortcoming by itself makes purely client-side rights management systems impracticable. In fact, client-side rights management systems appear to be little more than a resurgence of old personal computer software "copy-lock" technologies applied to digital content. Personal computer software copy-locking failed at least in part because of the burden of responsibility placed on the consumer to maintain their "copy locks". It is also significant that client-side rights management systems are often explicitly designed to make it difficult to archive and restore rights since archiving copies of rights and restoring them from archive when the original rights have expired is the most obvious way of attacking client-side rights management systems.

In addition, rights management decisions taken exclusively at the client-side are necessarily restricted to those decisions that can be taken within the immediate context of the client, based on what is known locally at the client. In practice, very little is reliably known at the local client. This dramatically restricts the rights management decisions that can be taken. For example, the local computer clock is easily tampered with so the DRM client has little reliable knowledge of the time and therefore has limited ability to faithfully implement start times and stop times. Furthermore, the local client is completely unaware of what other consumers are doing, thus making concurrent usage restrictions impracticable.

The local computer is even completely unaware of other computers/devices being used by the consumer, making it impossible to effectively manage the "roaming" of rights across multiple devices. Thus, storing rights on the client means that consumers must purchase rights separately for each computer on which they desire to access content. This runs counter to consumer expectations. By analogy, consumers do not typically purchase a book to read at work and another copy to read at home. This also runs counter to the increasingly mobility of computer users, with consumers using increasingly interchangeable net-enabled computers to access content and services over an increasingly pervasive global network.

According to a first aspect of the present invention, there is provided a system for managing a consumer's access to content to be rendered by a DRM client of the consumer, the system comprising:

a DRM server for engaging in a transaction with a consumer DRM client such that the transaction results in the consumer being granted at least one right to the content, the DRM server being arranged such that the at least one right is stored at the DRM server and the DRM server checks out a copy of the at least one right to a said consumer DRM client.

Amongst other things, this aspect of the invention provides consumers with the facility easily to recover a copy of the rights in the case of a failure of a consumer device on which the (initial copy of the) rights was stored.

The DRM server may include a storage device and is arranged to store the at least one right in the storage device and to allow the at Least one right to reside in the storage device for a predetermined time before being made void. The DRM server may be arranged to void the at least one right by removing the at least one right from the storage device.

The DRM server may be arranged so that the copy of the at least one right checked out to a said consumer DRM client is not identical to the at least one right stored on the DRM server. For example, the checked-out copy may include an expiry time, which in general is relevant to that client only.

The DRM server may be arranged to check out a further copy of the at least one right to a said consumer DRM client in the event that the or an earlier copy of said at least one right is lost or otherwise inaccessible to a said consumer DRM client.

According to a second aspect of the present invention, there is provided a system for managing a consumer's access to content to be rendered on a consumer content rendering device, the consumer content rendering device including a storage device, and wherein a DRM server is arranged to provide a copy of at least one right to the consumer content rendering device for storage in the storage device, the system comprising:

a DRM client on a consumer content rendering device that is arranged to attempt initially to retrieve a copy of at least one right from a storage device of the consumer content rendering device, and, in the event that a copy of the at least one right is not found in the storage device, to attempt to retrieve a copy of the at least one right from a said DRM server.

The DRM client may be arranged to allow a copy of the at least one right to reside in the storage device for a predetermined time before being made void. The DRM client may be arranged to void the at least one right by removing the copy of the at least one right from the storage device.

The DRM client may be arranged to allow the consumer to configure the predetermined time. This allows the user to shorten the time by which the right is voided, allowing the user more quickly to obtain the right next time if necessary or desired.

According to a third aspect of the present invention, there is provided a system for making rights management decisions relating to access to content, the system comprising:

a DRM server for making a first rights management decision based on a request from a DRM client for a right to access content and for responding to the request accordingly such that a said DRM client can make a second rights management decision based on the response from the DRM server.

As is discussed further below, such a distribution of the management making decisions enables many features which were simply not possible in prior art DRM systems which were in essence exclusively client-side or exclusively server-side.

The DRM server may be arranged so that the first rights management decision includes the DRM server refusing to grant a said DRM client the right to access the content on the basis that granting the right would cause a concurrent consumer limit to be exceeded.

The DRM server may be arranged so that the first distributed rights management decision includes granting the right to access the content on a plurality of devices.

The DRM server may be arranged so that the first distributed rights management decision includes limiting the number of devices that can be used to access the content.

The DRM server may be arranged to modify at least one individual right specification based upon at least one item of consumer information received from a DRM client.

The DRM server may be arranged to store a group right specification for at least one consumer of a group of consumers and to make a rights management decision based on the group right specification.

The DRM server may be arranged to modify at least one individual right specification associated with a first publisher based upon at least one transaction associated with a second publisher.

According to another aspect of the present invention, there is provided a system for making rights management decisions for content, the system comprising:

a DRM client that is arranged to request from a DRM server a right to access content and to receive from a said DRM server the result of a first rights management decision made at the DRM server, the DRM client further being arranged to make a second rights management decision based on a said result received from a said DRM server.

The DRM client may be arranged so that the second rights management decision includes determining whether the DRM client has a right to print the content. Alternatively or additionally, the DRM client is arranged so that the second rights management decision includes determining whether the DRM client has a right to save the content to a storage device.

According to another aspect of the present invention, there is provided a system for logging access to content by one or more consumers, the system comprising:

a DRM server that is arranged to log requests for access to content to produce a first log record and to receive from at least one DRM client a second log record of access to the content.

The DRM server may be arranged to merge the first log record and the second log record.

According to another aspect of the present invention, there is provided a consumer DRM client arranged to log access to content by the DRM client to produce a log record, the DRM client further being arranged to transmit the log record to a DRM server.

The DRM client may be arranged to temporarily cache the log record and to send the log record to a said DRM server after a predetermined period of time.

According to another aspect of the present invention, there is provided a system for obtaining from a DRM server a right to access content on a consumer device, the right to access the content being stored in both the consumer device and the DRM server, the system comprising:

a DRM client; and, a consumer device with which the DRM client is associated;

the DRM client being arranged first to attempt to retrieve the right from the consumer device and then, if unable to retrieve the right from the consumer device, to attempt to retrieve the right from a said DRM server.

The consumer device may have both persistent storage and non-persistent storage, the DRM client preferably being arranged to attempt to retrieve the right in the following order:

from the non-persistent storage of the consumer device, and then, if the right cannot be retrieved from the non-persistent storage of the consumer device, from the persistent storage of the consumer device, and then, if the right cannot be retrieved from the persistent storage of the consumer device, from a said DRM server.

According to yet another aspect of the present invention, there is provided a system for managing rights to content, the system comprising:

a DRM server that is arranged to handle rights management on behalf of a plurality of content publishers and to issue rights to one or more consumers accordingly.

The DRM server may be arranged to participate in rights management decisions in cooperation with a client-side DRM system.

The DRM server may be arranged to issue rights to DRM-protected content without which access to the said DRM-protected content is precluded.

The DRM server may be arranged to maintain accounts for consumers into which the plurality of content publishers can deposit consumer-specific rights.

The DRM server may be arranged to require that a consumer provide a consumer identification in order to download a right to access content.

The DRM server may be arranged to implement cross-consumer rights management policies. For example, the cross-consumer rights management policies may include rewarding first consumers for recommending second consumers to access DRM-protected content by granting the first consumers additional rights.

The DRM server may be arranged to implement cross-publisher rights management policies. For example, the cross-publisher rights management policies may include one publisher granting the consumers rights to another publisher's content as part of a promotion.

The DRM server may be arranged to permit at least one consumer to roam between at least two consumer devices and to ensure that said at least one consumer can only simultaneously access the content on a limited number of the at least two consumer devices.

The DRM server may be arranged to deliver a copy of a right to a consumer whilst retaining a copy of the right in storage.

According to a further aspect of the present invention, there is provided a system for providing rights to content to consumers, the system comprising:

a server that is arranged to provide a network-accessible interface that is arranged to enable publishers of content to create and configure rights templates that can be subsequently purchased by or granted to consumers as rights instances.

The server may be arranged to provide consumer accounts in which the rights instances can be stored.

According to a further aspect of the present invention, there is provided a system for providing rights to content to consumers, the system comprising:

a DRM server that is arranged to calculate a charge for a publisher based upon the number of consumers holding rights to content from the publisher on the DRM server.

The DRM server may be arranged to redetermine the charge at predetermined intervals.

According to a further aspect of the present invention, there is provided a system for providing rights to content of a publisher to consumers, the system comprising:

a DRM server that is arranged to calculate a charge for a publisher based upon the loading imposed on the DRM server by consumers holding the rights to content of said publisher.

The charge may be based on the number of individual accesses to the DRM server resulting from the consumers accessing content of said publisher.

According to a further aspect of the present invention, there is provided a system for providing rights to content of a publisher to consumers, the system comprising:

a DRM server that is arranged to calculate a charge for a publisher based upon the volume of the rights maintained on the DRM server on behalf of consumers holding the rights to content of the publisher.

The volume of the rights may be determined in accordance with the time that the DRM server holds said rights.

According to a further aspect of the present invention, there is provided a system for providing rights to content of a publisher to consumers, the system comprising:

a DRM server that is arranged to calculate a charge for a publisher based upon a percentage of the value of rights associated with content produced by the publisher and maintained by the DRM server.

According to another aspect of the present invention, there is provided a DRM client for obtaining access rights to DRM encrypted content and decrypting the content, the DRM client also being capable of encrypting content.

This enables any consumer of DRM-protected content to be a publisher of DRM-protected content.

The DRM client is preferably capable of adding a digital signature to content encrypted by the DRM client.

According to another aspect of the present invention, there is provided in combination, at least two DRM servers with a gateway therebetween, wherein one of the DRM servers is arranged to hold an account on behalf of a consumer and to allow said consumer to access DRM-protected content whose rights are controlled by the other of said DRM servers via the gateway.

In an embodiment, consumers can access content controlled by centralised digital rights management servers on which they do not directly hold consumer accounts by authenticating themselves via a gateway to the centralised digital rights management server on which they hold their primary consumer account.

The gateway between the at least two DRM servers may be operated subject to cross-charging relationships between the operators of the DRM servers.

The one of the DRM servers that holds an account for a consumer may be arranged to forward consolidated usage reports, consolidated statements and consolidated billing to said consumer based on total access to the DRM servers by the consumer.

Embodiments of the present invention will now be described by way of example with reference to the accompanying drawings, in which:

FIG. 8 illustrates schematically an example of a DRM bureau service acting as a "rights" bank;

FIG. 9 illustrates schematically an example of a DRM bureau service acting as a rights boutique;

FIG. 10 illustrates schematically an example of a DRM bureau service system that is usable for personal DRM-encryption;

FIG. 11 illustrates schematically an example of load-based pricing for use of a DRM bureau service;

FIG. 12 illustrates schematically an example of revenue-based pricing for use of a DRM bureau service;

"BUREAU CONCEPT" GENERALLY

In accordance with an embodiment of the present invention, in general terms an organisation (or application service provider, ASP), which typically will be centralised, operates one or more DRM servers on behalf of one or more publishers and/or one or more consumers. This service is hereafter generally referred to as a "DRM bureau service". As will be appreciated, "publishers" may also be "consumers". In some embodiments, the organisation may be a publisher.

Distribution of Rights Storage

Figure 4:
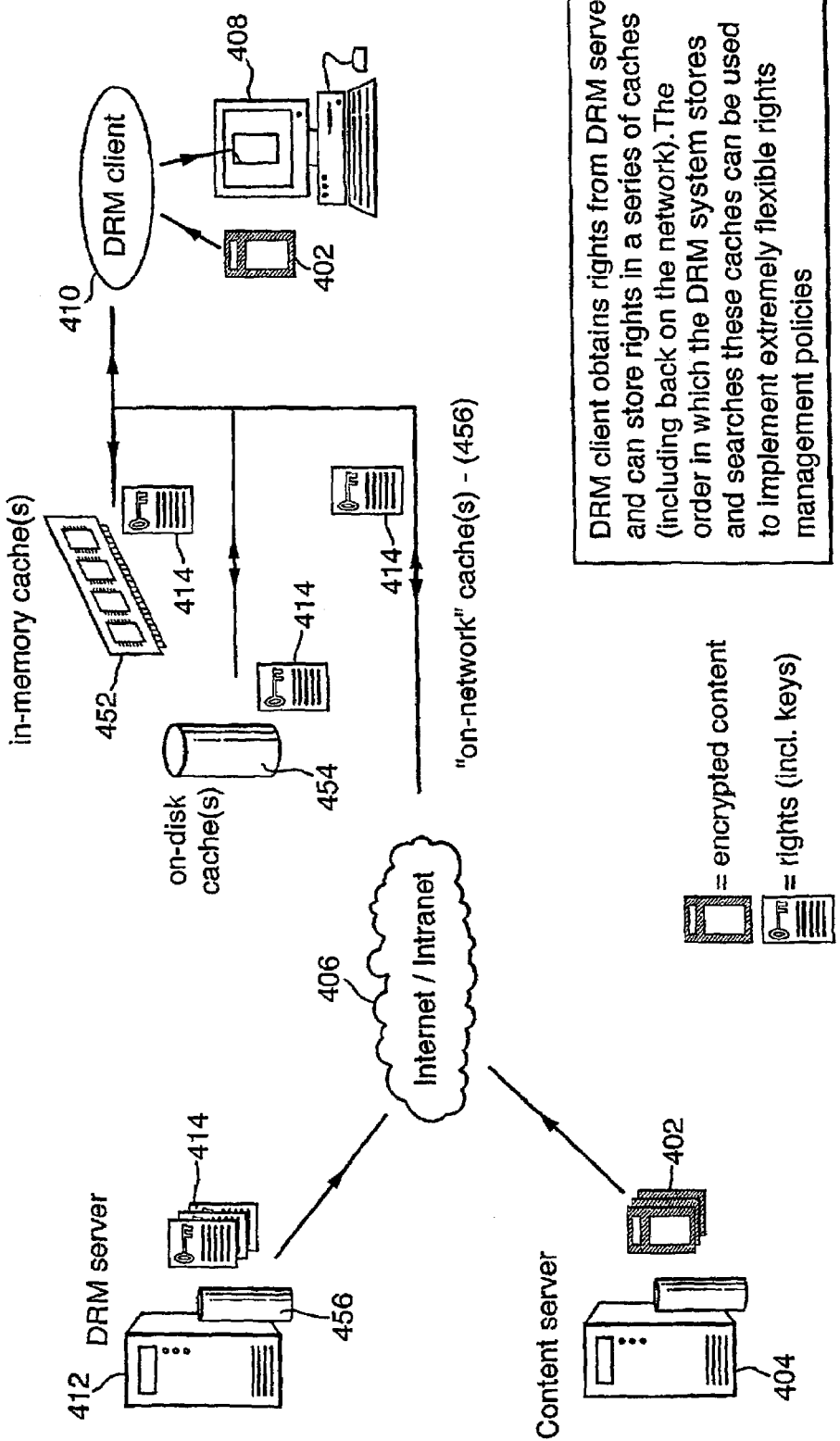
FIG. 4 illustrates schematically an example of a system of progressive caching for distributed DRM.

Referring to FIG. 4, distribution of rights storage and progressive rights caching will first be discussed. Bearing in mind that, in the preferred embodiment of digital rights management (DRM) operated in accordance or in conjunction with the present invention, there is a complete separation between the rights themselves and the (encrypted) content, in accordance with an embodiment of the present invention illustrated schematically in FIG. 4, the storage of rights is distributed between the client and a remote server (or set of servers) within a series of progressive caches. This allows optimisation of the use of network bandwidth and also provides other advantages as will be discussed further below, including for example the provision for off-line access to the content, sharing of rights between multiple processes on the client device, etc. Separately, a flexible structure of rights management policies may be implemented.

In FIG. 4, encrypted content 402 is provided from a content server 404 via a network 406 to a consumer device 408 that "executes" (via hardware or software, or a combination of both) a DRM client 410. That is, the DRM client 410 temporarily decrypts the DRM-encrypted content in a secure viewing/playback environment. The DRM client 410 interprets and implements the specified rights and manages the client-side elements of the progressive rights caching. In addition, a cooperating server-side rights management component, the DRM server 412, is provided. Client-side rights management typically pertains to local client-side activities, such as printing or saving DRM-protected content, while server-side rights management typically pertains to more global issues such as concurrency (the number of simultaneous accesses to DRM-protected content), control over the number of devices on which a consumer is allowed to access DRM-protected content, implementation of subscription models where one rights specification applies to multiple items of DRM-protected content, etc.

Rights originate from some server remote to the client (in FIG. 4, rights 414 originate from the DRM server 412) and are ultimately applied to content 402 downloaded to the client 408. That is, if there is to be any rights management decisions to be taken at the client, the rights must also travel to the client. However, in moving between the server and the client, the rights 414 are stored for arbitrary periods in a number of caches.

For example, one cache may be an in-memory cache 452 in the memory of the client-side device 408. The in-memory cache 452 may actually be a collection of various caches structured to facilitate sharing and control over client-side rights (e.g. global caches, per-process caches, per-viewer caches, per-thread caches, per-fibre caches, etc.).

Another cache may be in persistent storage 454 closely associated with the client-side device 408 (e.g. on a hard disk, removable disk, non-volatile memory, etc.)

Another cache may be in the temporary or persistent storage of a device permanently or temporarily attached to the client-side device (e.g. mobile telephone, PDA, smart card, etc.).

Yet another cache may be in temporary or persistent storage 456 on a remote net-accessible server (which does not imply a need for a permanent connection).

In order to implement various rights management policies, a client-side rights management component (which may be, but need not be, part of the DRM client 410) can search through these caches 452, 454, 456 in various orders for rights pertaining to a particular piece of DRM-encrypted content 402. In a typical embodiment, the client-side DRM component searches first in various in-memory caches 452 and then, if suitable rights are not found, it searches through various on-disk caches 454. If suitable rights are not found there, the client-side DRM component requests the rights from a remote DRM server 412 (acting as a network-accessible cache 456). The order of search is not limited to that set forth in this example. Different search orders may be required to implement different rights management policies.

Advantages of distributing the rights storage between the client and server, and implementing the described progressive caching mechanism, include: (i) protection against the loss of valuable rights due to the catastrophic failure of individual caches, e.g. an application process crashing and losing an in-memory cache as the client may be able quickly to obtain a copy of the rights locally from an on-disk cache for example, or a computer crashing and losing its in-memory and on-disk caches as the client may be able to obtain a copy of the rights more rapidly from a server cache; (ii) enabling the implementation of rights management policies that require distributed decision making and therefore require distributed rights storage, e.g. restrictions on the number of concurrent consumers of a content set (which requires a centralised server-based view of all the consumers of that content set); and (iii) mobility of rights between distributed caches enables mobility of consumer access to DRM-protected content. For example, rights can be "checked out" from the DRM server to a client-side cache on a particular consumer device (i.e. a copy is sent to the client with a copy being retained by the server) and then "checked back in" to the DRM server in order for it to be checked out again to a different consumer device. It should be appreciated that the right that is transferred to the client may not always be identical to the copy that is retained by the server because, for example, the transferred copy may include an expiry time relevant to that client only.

Distribution of Rights Management Decision Making

The actual rights management decision making process may be distributed between the consumer device (i.e. the point of consumption of digital content) and a rights management server (DRM server). It should be noted that conventional client-side DRM systems may sometimes appear to have a server component but these servers are restricted to supporting the initial purchase of rights and subsequent receipt and consolidation of client-side DRM log records. These servers do not play an active role in the ongoing rights management decision making process.

Distributing the rights management decision making process between the DRM client 410 and one or more centralised DRM servers 412 represents a significant advance over purely server-side or purely client-side DRM systems, in which the rights management decisions are taken either exclusively at the server-side or exclusively at the client-side, and is an approach which is well suited to managing digital content consumption over modern pervasive broadband networks.

Referring still to FIG. 4, distributed DRM employs intelligent hardware or software components active on both the client (DRM client 410) and one or more remote servers (DRM servers 412). In a distributed DRM system, the DRM client 410 associated with a consumer device and the DRM server 412 cooperate to arrive at a decision over whether a particular consumer on the consumer device can access a particular piece of DRM-protected content. This cooperation can involve communication between the DRM client and the DRM server and this communication may involve the exchange of rights encoded in electronic form.

Figure 5:
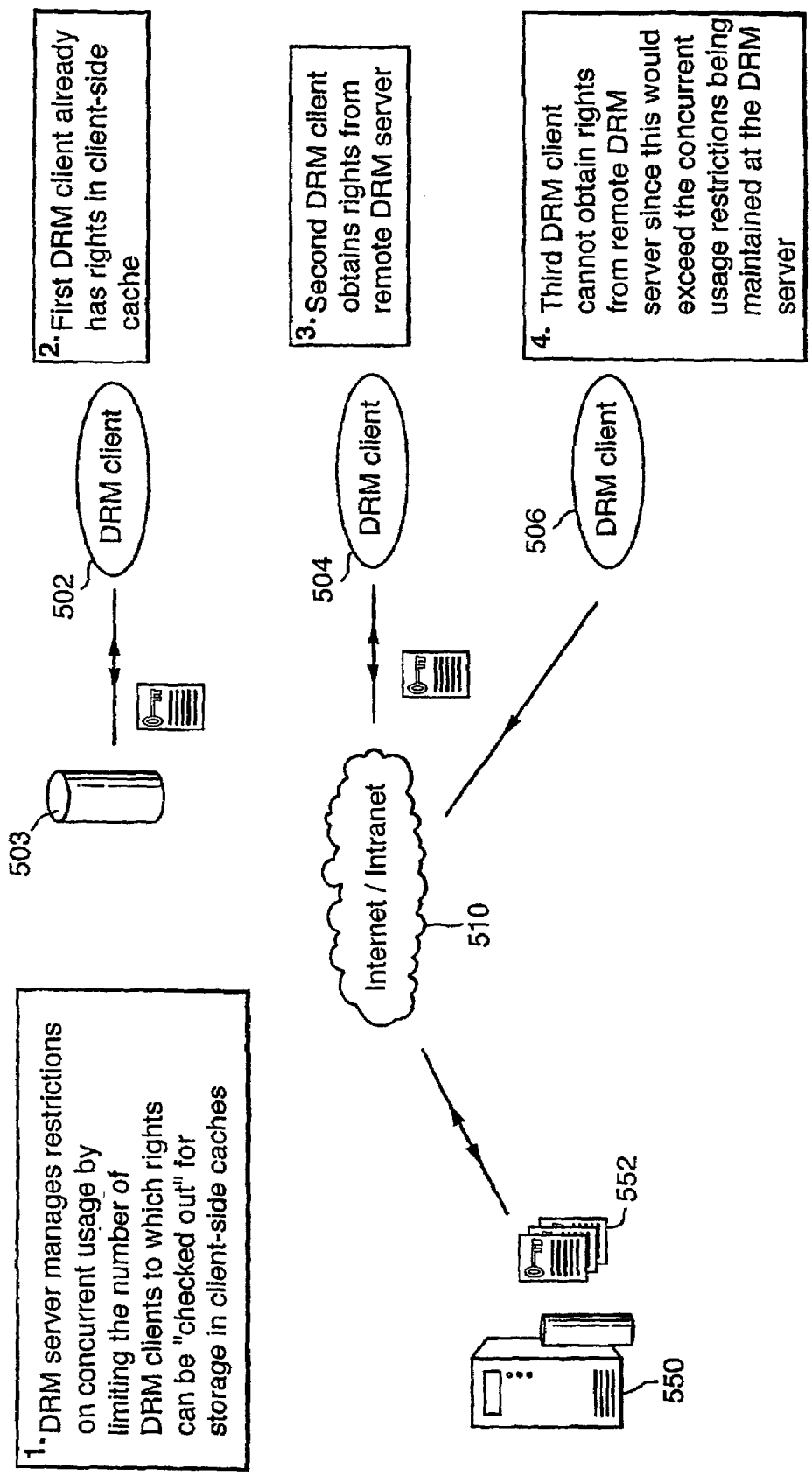
FIG. 5 illustrates schematically examples of various scenarios for using the FIG. 4 system.

An example scenario of such cooperation is illustrated schematically in FIG. 5. Referring to FIG. 5, a consumer attempts to access a DRM-encrypted content file that is subject to the rights management restriction that this file may only be simultaneously accessed by up to a hundred consumers. The DRM client 502, 504 or 506 checks its local client-side rights cache(s) for prior authorisation to access this DRM-encrypted content file. It could potentially find matching rights in any of its in-memory caches or in any of its on-disk caches, cached from an earlier request (and not necessarily for the same content file if the rights apply to multiple content files). If matching rights are not found, the DRM client 502, 504, or 506 can forward its request on to the remote DRM server 550. The DRM server 550 can look in its cache 552 for matching rights (for the identified consumer to access the DRM-encrypted content file) whilst also establishing whether the concurrent use restriction would be exceeded, e.g. whether this is the hundred and first consumer currently attempting to access the DRM-encrypted content file. If matching rights are available and the concurrent usage restriction is not being exceeded, the DRM server 550 can grant the DRM client 502, 504 or 506 permission to proceed and (optionally) send the DRM client a local version of the electronically encoded rights for storage in the progressive client-side caches.

In the FIG. 5 example, the DRM client 502 already has the rights in its client-side cache 503. The DRM client 504 obtains rights from the cache 552 of the remote server 550. The DRM client 506 cannot obtain rights from even the remote DRM server 550 because the concurrent usage restrictions maintained at the DRM server 550 would be violated.

As another example, the DRM process is operated to provide a rights management restriction whereby only a limited number of copies of the content can be printed by a user or users. Thus, a user is effectively issued with a corresponding number of print rights, those rights being stored on the DRM server 550. In use, the user issues a print command (directly or indirectly) to the DRM client 506. As a result, the DRM client 506 requests from the DRM server 550 the right to print a copy of the content. The DRM server 550 decides whether or not the user has the right to print the content and, if so, sends the right electronically to the DRM client 506. The DRM client 506 can then decide locally whether or not it can actually print the document based on the rights issued by the DRM server 550; in this example, this decision making process at the DRM client 506 may include taking into account how many copies of the content have already been printed by the DRM client 506. Thus, in this example, the distribution of the rights management making decision is (i) whether the user is to be permitted to print the content (decided at the DRM server 550) and (ii) the number of copies that can actually be printed (decided at the DRM client 506 based upon the rights issued by the DRM server 550 and optionally taking into account local conditions)

It will be appreciated that this second example can be applied by analogy to many processes which take place only at the client side and about which the DRM server may or will typically have no knowledge, including for example the saving of the content to a hard disk at the client.

Thus, this distribution of the rights management decision making process between cooperating hardware and/or software DRM components at the client and server allows the implementation of rights management policies that utilise knowledge outside the immediate context of either of the client or the server taken alone. An embodiment can provide support for managing rights on a concurrent usage basis (e.g. restrictions on the number of concurrent consumer devices, consumers and groups of consumers accessing a set of digital content). An embodiment can provide support for managing rights across multiple consumer devices (e.g. allowing consumers to access DRM-protected on multiple devices utilising rights stored on a centralised DRM server). Furthermore, support can be provided for coordinated management of rights across multiple consumers, groups of consumers, content publishers, etc. An example of coordinated management of rights across multiple consumers is the issuing of one consumer (additional) rights to access content in return for actions performed by that consumer, e.g. recommending a friend to purchase rights. An example of coordinated management of rights across groups of consumers is the issuing of rights to a group of consumers (e.g. a department within a company). Consumers would be permitted to access their rights by virtue of belonging to the consumer grouping. Revoking rights could be implementing by removing a given consumer from membership of a given consumer grouping. Concurrent usage restrictions could be applied to a consumer grouping, e.g. allowing a maximum of 10 consumers within a given group access to a set of content. An example of coordinated management of rights across multiple content publishers is the issuing to consumers acquired by a first content publisher (i.e. consumers for whom an account was created on the DRM server to store rights to content published by the first content publisher) with rights to sample content from another content publisher.

Information Logging

Since DRM systems closely manage the process of consumers accessing DRM-protected digital content, the DRM systems are in a unique position to gather information about consumer access patterns, e.g. which consumers are accessing the publisher's content, on which devices, at what time, for how long, whether they printed copies, etc. Consequently, most DRM systems log various amounts of usage-related information and attempt to route that logged information back to the publisher. The publisher typically uses these logs (directly or via an intermediary) to construct reports for:

(i) billing—logged measurements of the use of DRM-protected content can serve as the basis of usage-related billing systems and logged financial transactions involved in the purchase or granting of rights to consumers are required for billing purposes;

(ii) product "tuning"—detailed feedback on consumer access patterns enables publishers to adjust their content sets and their rights management policies to better meet consumer demand; and, (iii) market research—detailed feedback on consumer access patterns is a phenomenally powerful means of conducting market research, e.g. profiling consumer preferences by market segment, country-of-consumption (if logged), correlation between the purchase of digital products from different market sectors, etc.

Figure 6:
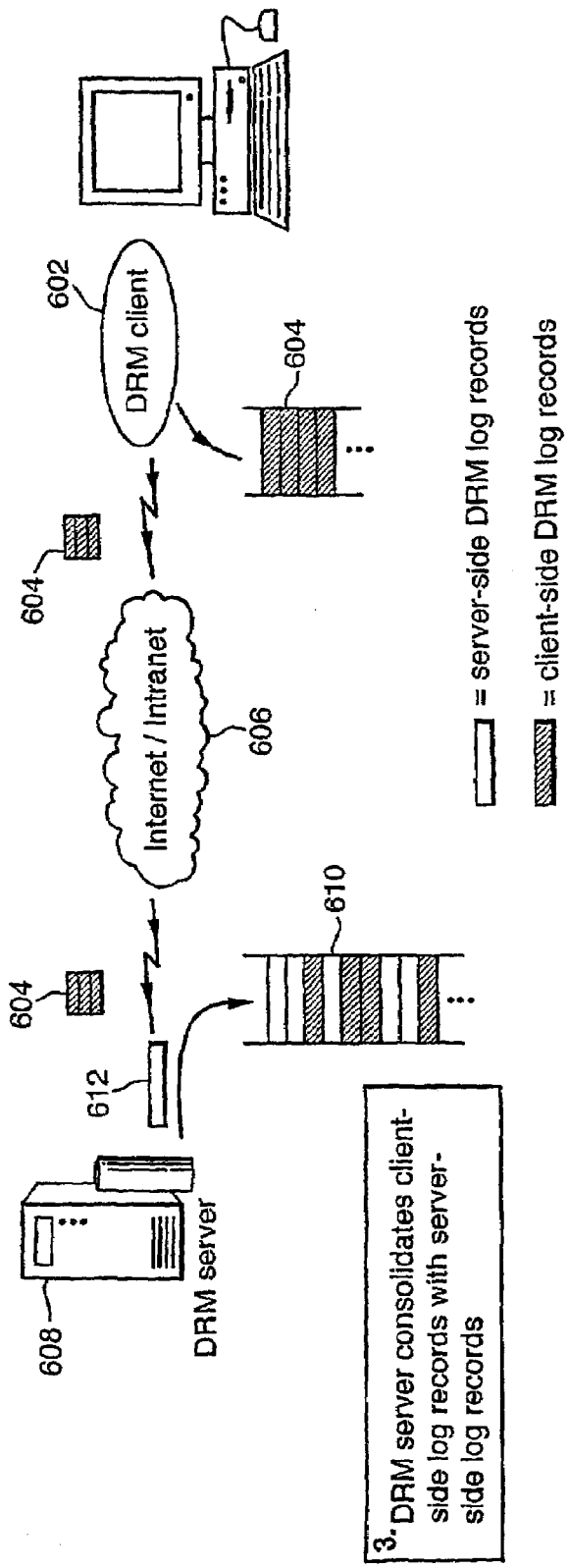
FIG. 6 illustrates schematically an example of a system for distributed rights logging.

In accordance with the embodiment of the invention illustrated in FIG. 6, such information logging is performed in a distributed DRM environment. Since access to the content is via the DRM client 602 hardware or software, the client 602 can log every aspect of the consumer's access to DRM-protected content. This information may include, for example: consumer identity; group identity (e.g. a corporate department to which the consumer belongs); point-of-consumption device identity (e.g. device IDs, network addresses, etc.); point-of-consumption device location (geographic locale, time zone, etc.); DRM-protected content identity (e.g. the content sets and subsets to which a particular piece of content belongs, specific item identifiers, etc.); time and duration of access to DRM-protected content; time and duration of all DRM-related operations; use made of DRM-protected content, e.g. viewed, played, paused, printed, saved, etc.; and, success or failure of attempted operations, e.g. the refusal of a request to print a document.

In accordance with one embodiment, the logging of consumer access activities is directly to the DRM server 608 (for server-side consolidation with DRM log records 610 from other consumers or consumer devices), while in other embodiments the logging information is cached locally on the consumer device 604 for later transmission to the DRM server 608. DRM transactions that directly involve the DRM server 608 (e.g. a client-side request for rights that are not already cached on the client-side) can result in the immediate generation of DRM log records 612 at the server. When client-side log records 604 arrive at the DRM server 608, they can be consolidated with pre-existing server log records 610 and sorted/collated by time stamp, publisher, consumer, etc.

Server-side consolidation of DRM log records from both the DRM client 602 and the DRM server 608 provides a far more comprehensive record of what consumers are doing with DRM-protected content than either client-side logging or server-side logging can provide alone. Client-side logging is typically of activities that would otherwise be entirely unknown to a server-side logging mechanism and vice versa. For example, the logging associated with current server-side access control systems clearly does not record basic client-side activities such as printing or saving of a DRM-protected document.

Client-side logs 604 can be transmitted to the DRM server 608 (for consolidation with server-side DRM logs 610) in a number of ways. For example, in the presence of a suitable network connection (not necessarily permanently held open) between the DRM client 602 and the DRM server 608, client-side log records can be sent immediately to the DRM server 608. Alternatively, in order to reduce traffic between the DRM client 602 and the DRM server 608, client-side log records 604 can be cached in temporary or permanent local storage and batched up for transmission either on a periodic or scheduled basis or after the expiration of some "watchdog timer" set by the presence of new client-side log records. As another example, the log record transmission can be "piggy-backed" onto some higher-priority traffic between the DRM client and the DRM server. Some combination of the above techniques can be used. For example, if a log record has not been "piggy-backed" within a watchdog period, then it can be sent independently.

If log records are being cached for later transmission, a limit may be imposed on the number of records sent in an individual network transaction with the DRM server, in order to reduce the load on the network and on the DRM server.

In much the same way that content and rights are protected from abuse while resident on the consumer device, cached client-side log records can be protected from tampering and deletion. This is achieved in some embodiments by, for example: using encryption and non-obvious storage to obfuscate the log records; linking the survival of the log records to the ongoing survival of the consumer's access rights, i.e. if a consumer manages to destroy their log records (perhaps attempting to avoid usage-related payment) they also prevent themselves from having further access to the content; and associating log records with some predictable sequence so that the absence of log records can be detected.

Servicing Plural Publishers/Consumers

Figure 7:
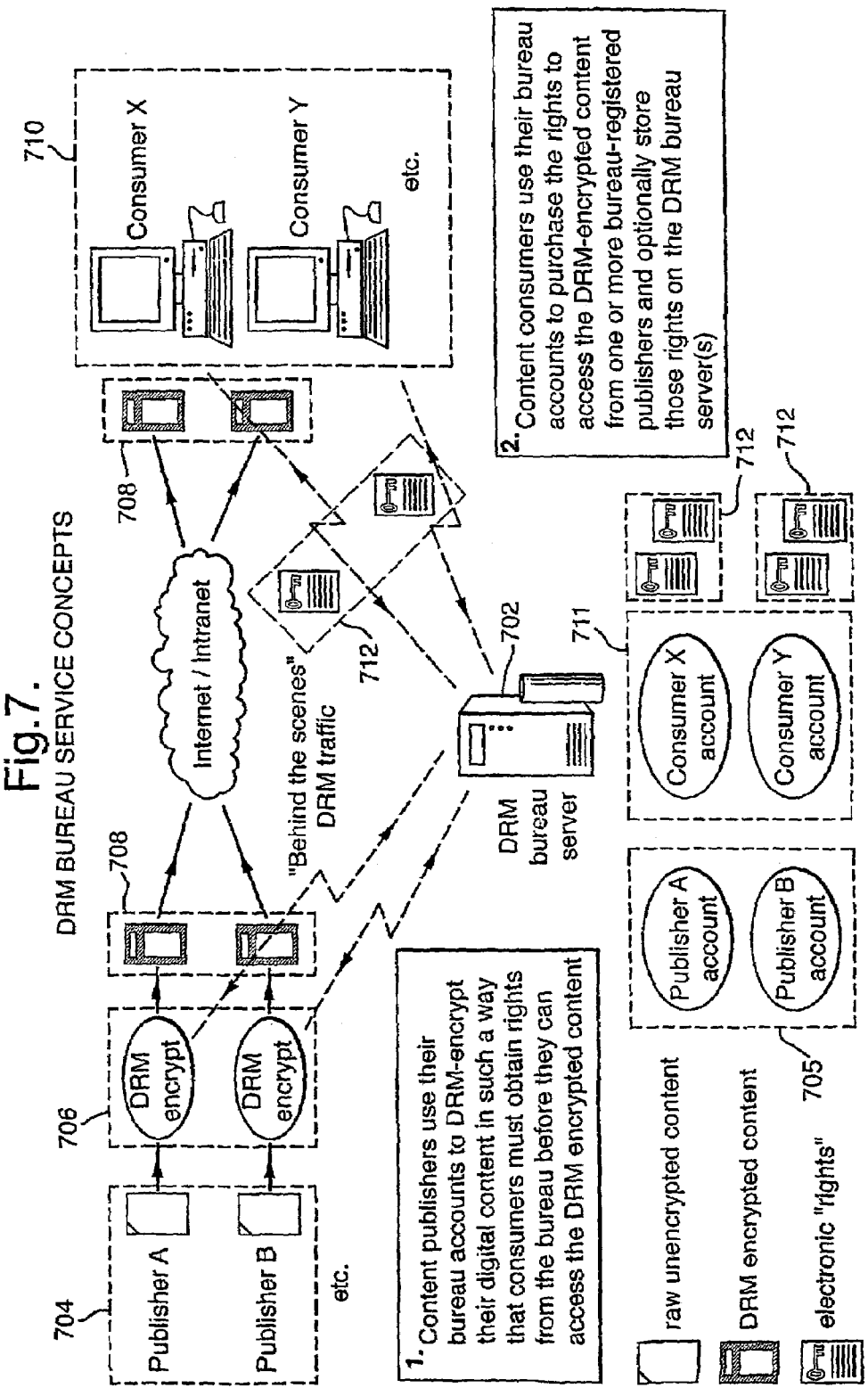
FIG. 7 illustrates schematically basic DRM service bureau concepts relating to an embodiment of the present invention.

In accordance with one embodiment, illustrated schematically in FIG. 7, a bureau service 702 appears in practice as a Web site at which both content publishers 704 and content consumers 710 can open accounts 705 and 711 respectively. Content publishers 704 use their bureau accounts 705 to DRM-encrypt 706 their digital content 708 in such a way that consumers 710 must obtain rights 712 from the bureau before they can access the DRM-encrypted content 708. Content consumers 710 use their bureau accounts 711 to purchase the rights 712 to access the DRM-encrypted content 708 (from one or more publishers) and can optionally store their rights 712 on the bureau's DRM servers 702.

It should be noted that the bureau service 702 does not need to host content 708 though in some embodiments the bureau service 702 does host some sample DRM-encrypted content. Publishers 704 can either host the DRM-encrypted content 708 on their own sites or out-source the hosting of DRM-encrypted content 708 to third party hosting services, content aggregators, portal sites, etc.

Behind the scenes, the bureau service operates a number of DRM servers. The bureau service 702 therefore acts as a centralised repository or "bank" for the digital rights 712, with DRM traffic flowing transparently through the bureau service 702 as consumers 710 access DRM-encrypted content 708 from other locations.

DRM bureau services based upon distributed DRM systems are quite different from the clearing house services of client-side DRM systems. Client-side DRM systems store their rights at the point of consumption (i.e. the client-side) and are restricted to making rights management decisions at the point of consumption. On some intermittent basis these decisions are relayed on to a network-accessible clearing house where they form a part of a reactive audit trail, with publishers receiving royalties based on audited usage.

In contrast, in this embodiment, the DRM bureau service stores the rights on the bureau service's DRM servers and proactively serves rights in response to consumer demand. This proactive and centralised control over consumer's access rights offers several advantages over previous reactive approaches. For example, the centralised bureau service can implement rights management methods that use a centralised view of consumer access patterns, e.g. restricting an organisation to a predetermined number of concurrent accesses to a content set (from individual consumers or groups, e.g. departments). As another example, the centralised bureau service can easily implement cross-consumer and cross-publisher rights management policies, e.g. providing access to preview music tracks from one publisher in exchange for subscribing to a text journal from another publisher. As another example, when rights are stored on the consumer device, there must be some mechanism to prevent these rights being copied from device to device (along with the DRM-encrypted content). This inevitably leads to the consumer being forced to access DRM-protected content from a limited number of devices (usually one device). Storing the rights on a centralised bureau service DRM server, especially one that is accessible via the Internet for example, enables consumers to access DRM-protected content from whichever computer or other device they choose, which is a feature that is of rapidly increasing importance in an increasingly mobile world. As yet another example, proactive serving of rights from a centralised DRM server gives publishers immediate and continued control over their content, e.g. revoking rights from a specific consumer for a proactive DRM solution is as simple as removing a record from a DRM server database. Reactive DRM solutions, where the rights are stored on the consumer device, must typically wait until those rights expire according to their original terms.

Rights Bank

FIG. 8 illustrates schematically an example of a DRM bureau server 801 operating as a "rights bank". The "rights bank" service is particularly useful for a consumer who wishes to access DRM-encrypted content to which she has the rights from more than one device, such as a work PC 802 and a home PC 804. When a consumer purchases the rights to access bureau DRM-protected content (or is granted those rights), the rights are initially deposited in the consumer's bureau account 806. Before the consumer can access the relevant DRM-protected content, the rights must travel to the point of consumption, i.e. the consumer device 802 or 804, where the rights are interpreted by the DRM client (which is a software and/or hardware component, typically, executing within the consumer's device 802 or 804). The DRM client can obtain the rights from the DRM server 801 at some time prior to accessing the content (e.g. at the time of requested access, at the time of purchase of the rights, etc.). In one embodiment, the DRM server 801 retains active copies of the rights at the DRM server 801 when the rights are sent to the DRM client. The rights are thus "checked out" (checked out rights being denoted in FIG. 8 by reference numeral 808) to the client for a period of time (which can range from say seconds to forever). This active persistence of rights on the DRM bureau server 801 makes the DRM bureau server 801 effectively a "rights bank".

The DRM bureau server 801 can be configured to limit the number of consumer devices (for an individual consumer) to which these rights can be checked out at any one time. This has the advantages that publishers have control over how many devices a particular consumer can use to access their content and that, subject to publisher agreement, consumers can access DRM-protected content on multiple devices, e.g. work and home PCs.

Thus, a consumer's concerns about being restricted to a specific device (and, for fixed devices, a single location) are balanced against the publisher's concerns about possible abuse from consumers sharing authentication details (e.g. a username and password used to identify the consumer to the DRM client). With restrictions on the number of devices from which a consumer can access DRM-protected content, the consumer will be less likely to share authentication details since the other consumers with whom they share their details will be able to "lock out" the original consumer from their content.

Furthermore, the likelihood of consumers losing access to rights stored only locally on their consumer devices is in general high, for reasons ranging from forgetting their passwords to catastrophic failure of the client device. Making the consumer responsible for archival of disaster recovery of their rights will meet with stiff consumer resistance, especially if the DRM client makes recovery from archives difficult because of its attempts to protect those rights from tampering. Retaining active copies of the consumer's rights on a bureau server makes it possible for the consumer to recover her rights at any time. The DRM system can support rights recovery directly, for example via the bureau Web site, and/or indirectly, for example via customer support (perhaps in cases where the bureau needs to establish that the recovery is for legitimate reasons rather than an illicit attempt to obtain additional rights).

The so called "perpetuity problem" is one of the biggest obstacles to the widespread commercial consumption of digital content and typically manifests itself in two ways. First, consumers are accustomed to purchasing more traditional content formats (e.g., print, CD music, etc.) at a point in time and then being able to access that content in perpetuity. In practice, "perpetuity" in such cases equates to periods in the region of ten years, but the consumer perception is of a need for literal perpetuity. Secondly, digital content formats are evolving at an extremely rapid pace (in terms of compression and quality, for example) and are designed for consumption on consumer devices (principally computing devices) that are themselves also evolving at a similar pace. This rate of change of digital media formats and computer-based consumer devices considerably reduces the feasibility of delivering digital content with lifetimes comparable to more traditional media formats.

So, on the one hand consumers want access to purchased content in perpetuity while on the other hand publishers wish to use DRM systems to protect that content from unauthorised redistribution. This can be achieved utilising the bureau service not only as a centralised store of rights but also as a means to apply or upgrade existing rights to old digital content that has been updated to new media formats and/or for new consumer devices.

It will be appreciated that the consumer desire for perpetuity access corresponds to a requirement to maintain their rights on bureau DRM servers in perpetuity, and preferably to have the option to have those rights upgraded or updated as necessary. This in turn implies a requirement for someone to pay to maintain those rights on the DRM bureau servers until the consumer no longer requires access to them.

Embodiments of the DRM bureau can offer various revenue determination methods to address consumers' expectations of perpetuity. For example, the consumer can pay the DRM bureau a recurring fee (effectively a subscription) in order to "bank" their consumer rights. This fee can be regarded as covering the cost of a form of insurance that protects the consumer against the accidental loss of rights, provides value-added features such as "rights roaming" as discussed later, and provides a route to apply or upgrade existing rights to old digital content updated to new media formats and new consumer devices. Alternatively or additionally, the publisher can pay the DRM bureau a recurring fee in order to maintain consumer rights on the DRM bureau service and thereby improve their consumer experience. In practice, this implies that the consumers will themselves pay the publisher some form of recurring fee (which may be non-monetary, e.g. some "service-in-kind" such as accepting advertising).

Rights Boutique

FIG. 9 illustrates schematically an example of a DRM bureau service operating as a "rights boutique". Using the bureau, a publisher 902 of content configures (optionally from pre-configured "off-the-shelf rights templates" 904 provided by the bureau) "rights templates" 906 which can then be purchased by or granted to consumers as "rights instances" 908. The act of selling or granting rights to a consumer results in a copy of a rights template being instantiated 908, associated with the consumer and/or consumer device(s) and/or associated with particular items of digital content and "deposited" in the consumer's bureau account 912.

Since the rights template configuration forms are hosted on the bureau server 910 (typically accessible via a standard Web browser), the publisher does not have to install any specialised hardware or software on their local computing devices. Configuring rights templates can range from configuring templates from scratch to choosing from a selection of pre-configured templates (with the ability to reconfigure the off-the-shelf templates). The "off-the-shelf" templates may include basic or common rights limitations (such as "no printing" or "print once only" or "no save allowed") which can be tailored or adapted by a publisher according to need (e.g. to add an expiry time for a particular customer). In some embodiments, the DRM bureau optimises pre-configured off-the-shelf templates to suit different publishing market segments, e.g. music, legal, etc.

Person DRM-Encryption

Cryptographic techniques used by modern DRM systems are inherently symmetrical. That is, the algorithms used for encryption are largely identical with those used for decryption (and signing for signature verification). Thus, referring to FIG. 10, the hardware and software used by the DRM client 1006 (installed on the consumer's device) contains most if not all of the functionality required to DRM-encrypt content in the first place. As a result, the DRM bureau service may be used for "personal DRM-encryption" to encrypt raw unencrypted content 1008 into DRM-encrypted content 1010. The bureau server 1012 can manage the rights as discussed above.

In accordance with one embodiment, all the functionality required to DRM-encrypt content is included in the basic DRM client 1006, while in other embodiments sufficient functionality is included in the basic DRM client 1006 such that remaining functionality 1004 can be downloaded on demand (e.g. using technologies such as Java or ActiveX). As a result, every consumer that has been DRM-enabled in this way is a DRM-capable publisher when taken in conjunction with a full-service DRM bureau.

The DRM client-based encryption application is hereafter referred to as the DRM client encryptor. This application is especially powerful if the DRM client can be activated within the context of the DRM bureau (e.g. within the pages of a Web-based DRM bureau, i.e. in-browser) so that the operation of the DRM client encryptor is tied seamlessly to that of the DRM bureau service (e.g. so that rights management parameters configured on the bureau service, such as the name of a content subset, can be handed transparently from the bureau service database to the DRM client encryptor).

Publishers using a DRM bureau service according to this embodiment need only download and install one ubiquitous DRM client. They would generally want to do this in any case to be able to access DRM-encrypted content for test purposes. If more sophisticated DRM-encryption functionality is required (e.g. streaming encryption), the publisher can obtain additional toolkits (e.g. by download and installation) in addition to the basic DRM client. Unencrypted content need never leave the publisher's site. The content is encrypted in place by the DRM client encryptor.

Furthermore, with every DRM-enabled consumer also being a DRM-capable publisher, opportunities are opened up for greater personal control over personal information. (Control over personal information has previously been the preserve of centralised MIS departments, trusted third parties, etc.). Being able to DRM-encrypt one's own content, issue rights to specified individuals and being able to revoke those rights, represents a big step forward in terms of personal privacy.

Pricing Methods

Pricing methods for a DRM bureau service are now discussed. FIGS. 11A to 11C illustrate schematically examples of a load-based pricing method for a DRM bureau service. In general, the pricing methods extended by a DRM bureau service to its users (i.e. publisher and consumers of DRM-protected content) should at least cover the costs of maintaining the DRM bureau service infrastructure and make commercial sense to publishers and consumers. However, the derivation of an equitable pricing method for a DRM bureau service is complicated by the fact that some DRM-encrypted content may be subject to a consumer charge and by the fact that some DRM-encrypted content may be free to consumers but still subject to publisher control (e.g. rights expire after a certain period). Different commercial methods (e.g. subscription vs. metered vs. pay-per-use) can result in dramatically different loading on the bureau DRM servers.

The issue of "perpetuity" is also one that may need to be considered. That is, whereas a physical book may effectively be considered to last forever there is no practical equivalent for digital content given that the computing platform for which it is purchased requires continuous hardware and software updates, effectively rendering it obsolete within approximately five years.

In accordance with an embodiment of the invention then, a load-based pricing method is based upon three pricing axes. FIG. 11A illustrates schematically one such axis, based upon the number of bureau consumer accounts holding rights on the bureau DRM server pertaining to DRM-encrypted content from a given publisher ("maintained accounts"). FIG. 11B illustrates schematically an axis based upon the degree of consumer activity for content from a given publisher ("consumer activity"). FIG. 11C illustrates schematically an axis based upon the volume of rights being maintained per consumer for content from a given publisher ("rights volume"). In practice, the pricing method extended to bureau-registered publishers (and optionally bureau-registered consumers) may be a combination of one or more of these pricing axes.

Figure 1:
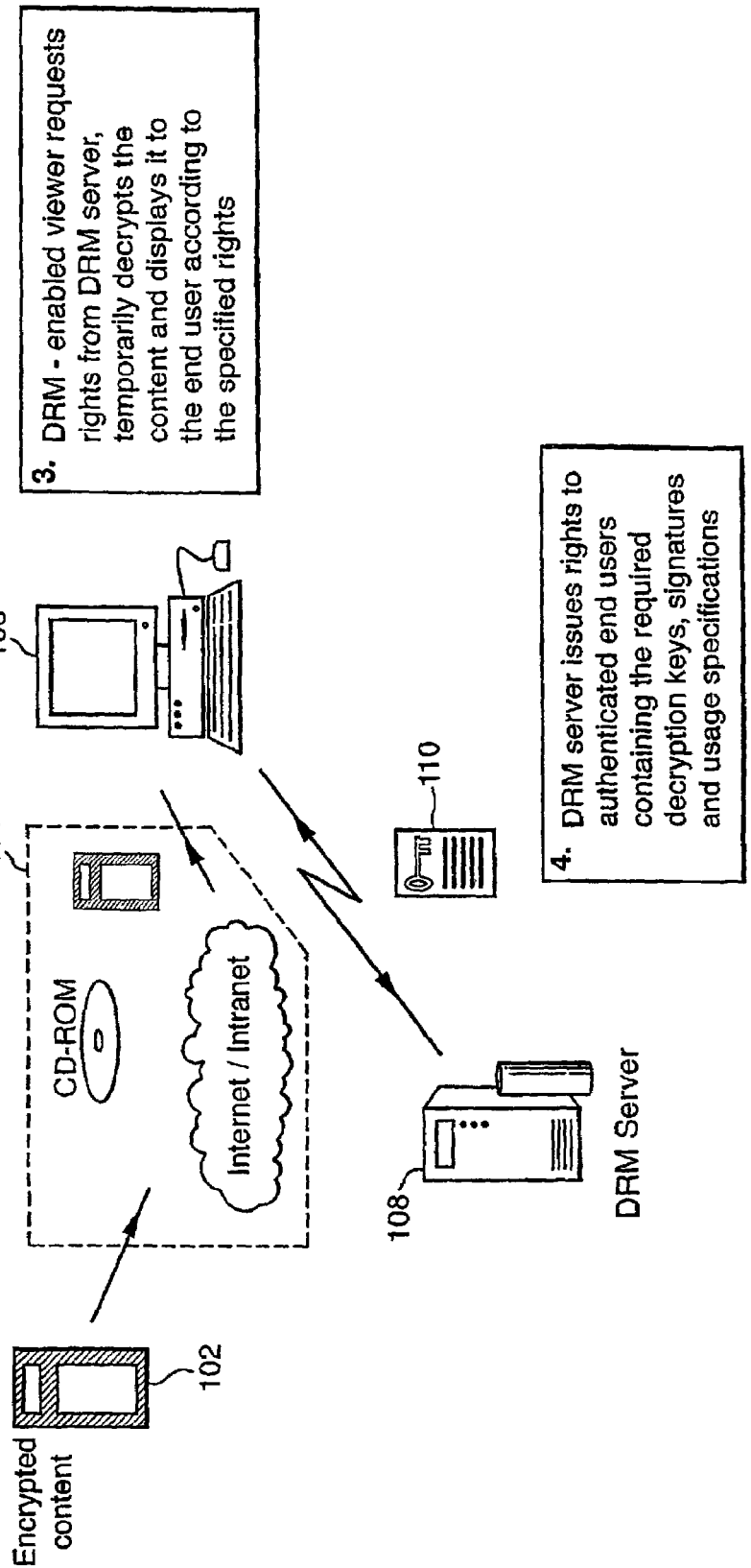
FIG. 1 illustrates schematically an overview of how typical DRM services work.

Referring to FIG. 11A (maintained accounts), say once every bureau accounting period (for example every month), database queries are run against the bureau DRM servers to effectively count the number of bureau-registered consumers storing rights on the bureau DRM servers pertaining to content from each bureau-registered publisher. Publisher X is then charged (by the bureau) in proportion to the number of consumers storing rights to X's content on the DRM server. The exact relationship between the number of consumers and the price charged to publisher X can be tuned to market conditions, e.g. a straight price per consumer (FIG. 11A-1), banded pricing for quantised "jumps" in the number of consumers (FIG. 11A-2), a curve (FIG. 11A-3), etc.

FIG. 11B illustrates schematically the pricing method based on consumer activity. Say once every bureau accounting period (for example every month), database queries are run against the bureau DRM servers that effectively count the number of times each bureau-registered consumer (bureau consumer) "hit" the bureau DRM servers in order to access content from each bureau-registered publisher (bureau publisher). Each consumer "hitting" the DRM server for a given publisher's content is added into a load category depending upon the number of hits within the accounting period. Any number of load categories may be employed but, in accordance with one example embodiment shown in FIG. 11B-1, four load categories are employed ranging from no hits to many hits. The four load categories are:

(i) inactive—no load on bureau DRM servers for publisher X;

(ii) low use—relatively minimal load on bureau DRM servers for publisher X;

(iii) medium use—relatively moderate load on bureau DRM servers for publisher X; and, (iv) high use—relatively considerable load on bureau DRM servers for publisher X.

Figure 2:
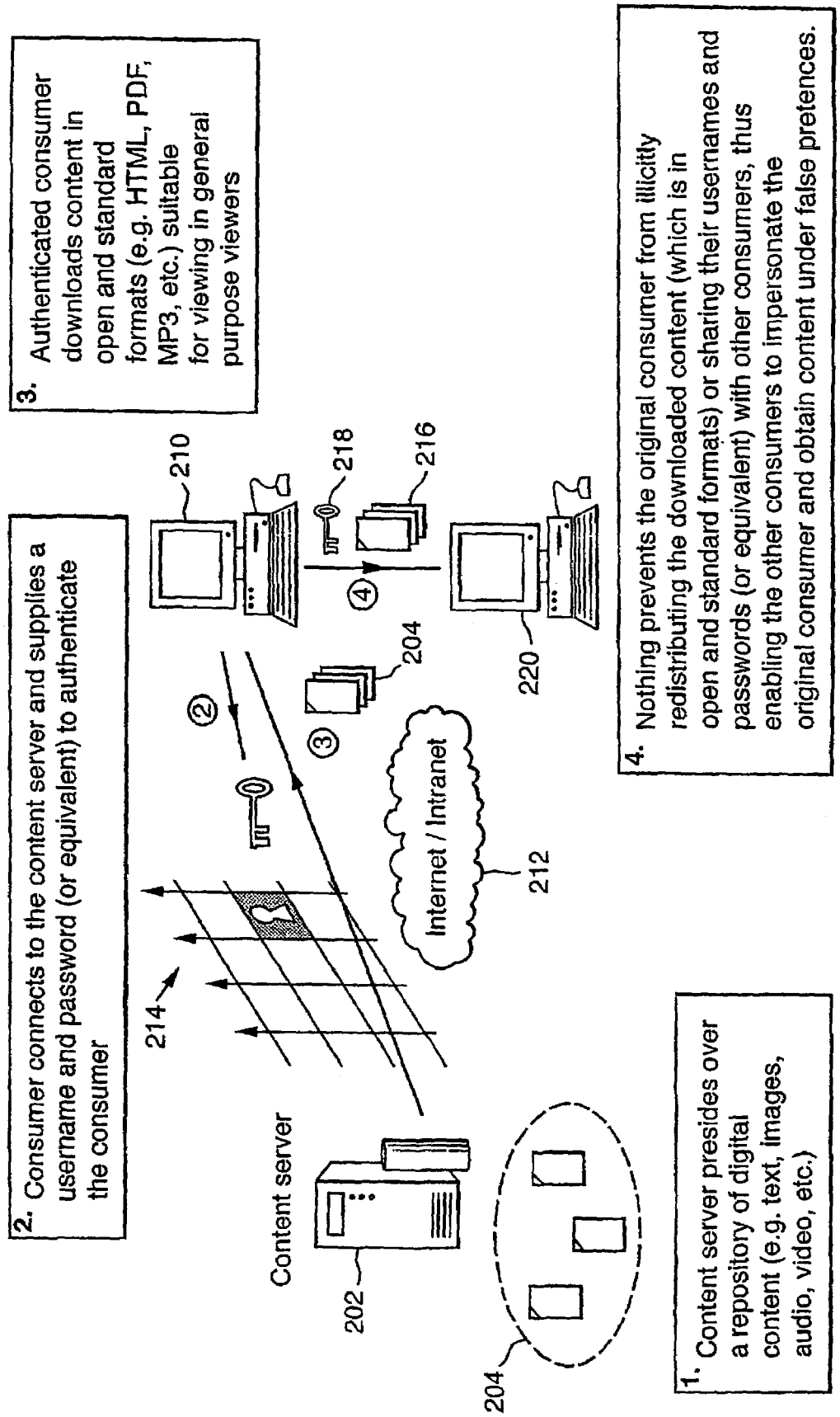
FIG. 2 illustrates schematically an overview of conventional server-side DRM.
Figure 3:
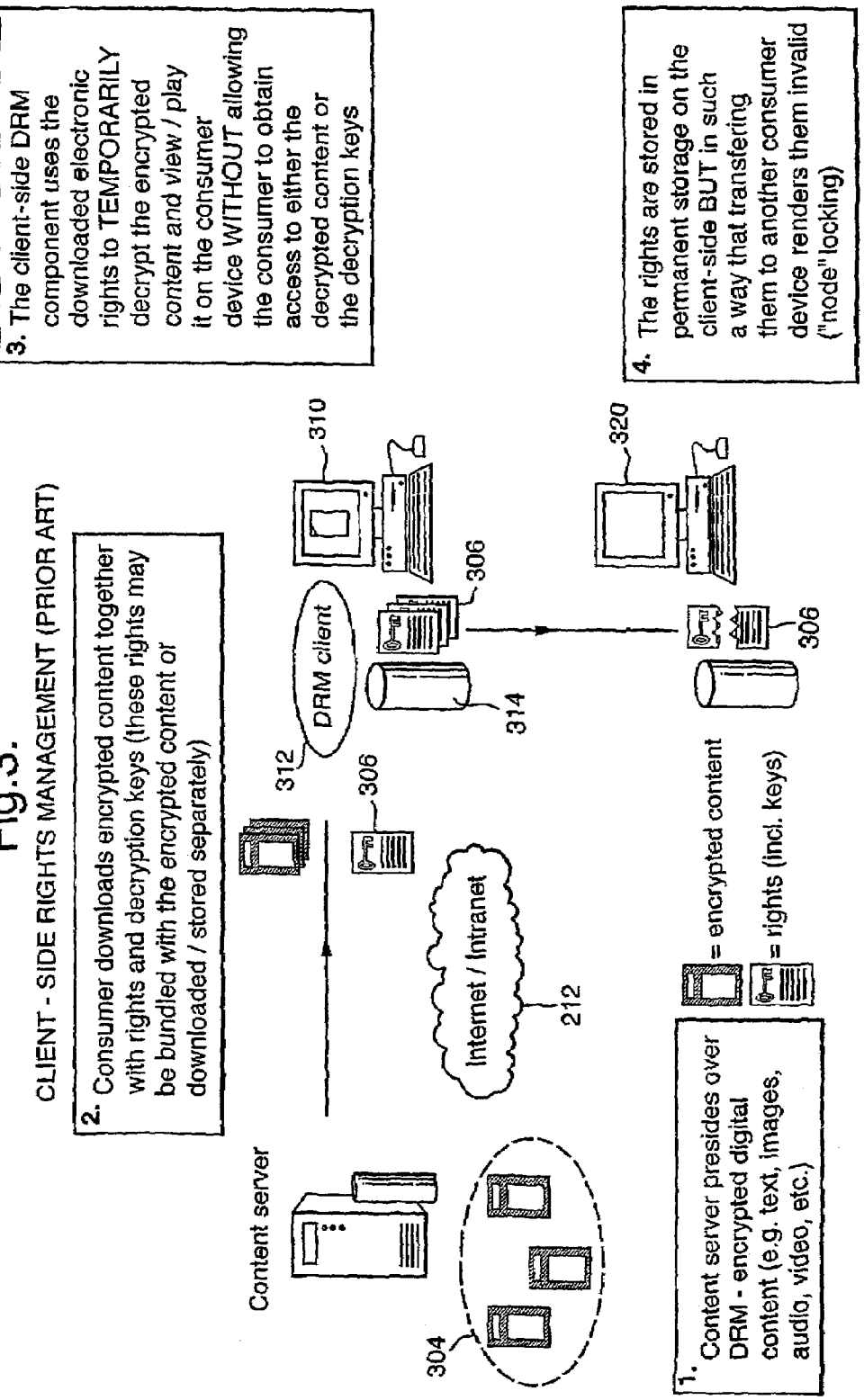
FIG. 3 illustrates schematically an overview of conventional client-side DRM.

As indicated in FIG. 11B-2, each load category is associated with a fee for the duration of the bureau accounting period. The total price for each load category is therefore the number of accounts placed into each load category multiplied by the load category fee. The total price for publisher X is the sum of the totals from each load category. The load category fees are calculated against the cost of the bureau infrastructure and operational costs required to sustain these account loads and are charged by the bureau service to the relevant publishers (in this case publisher X).

"Rights volume" accounting is now discussed with reference to FIG. 11C. Say once every bureau accounting period (for example, every month), database queries are run against the bureau DRM servers to effectively meter the number of distinct rights being maintained by each bureau-registered consumer for content from each bureau-registered publisher. For example, consumer Y's account may be maintaining the rights for several distinct products from publisher X. This represents more potential accesses to publisher X's content than a consumer with just the rights to a single product and hence more value to the publisher X.

The bureau calculates, across all bureau-registered consumers, a cumulative metric of the volume of rights being maintained for publisher X's content. In some embodiments, since rights are continuously flowing in and out of the bureau DRM servers, the metric is calculated from the volume of rights and the time those rights spend on the DRM bureau servers, giving rise to the concept of "rights days" or "rights minutes", etc. For example, in FIG. 11C-1, the volume may be calculated by the area under the curve.

In the context of paid consumer access to bureau-protected content, one charging method for the bureau is to retain a percentage of each purchase, e.g. if a bureau-registered consumer is charged $100 for a year's subscription to a financial research report the bureau could retain, say, 15% or $15 and pass on an 85% or $85 royalty to the publisher. In practice, however, this simplistic charging method may be perceived as inequitable by publishers of high value and low volume content who may be charged as much or more than low value and high volume publishers despite causing minimal load to the bureau DRM servers (due to the low volumes).

In accordance with an embodiment of a pricing method, a more equitable revenue-based bureau pricing method is employed, whereby the percentage of revenue claimed by the bureau is calculated from a grid whose axes are the value of the content and the volume of purchase transactions. An example of such a grid 1201 is illustrated schematically in FIG. 12.

The y-axis 1202 of the grid 1201 represents purchased content value, and the x-axis 1203 of the grid 1201 represents purchase volume. The stacks of coins in the grid 1201 represent relative revenue percentages paid by the publishers in accordance with this pricing method embodiment. For example, high volume publishers pay the bureau the smallest percentage of their revenue relative to publishers with the same purchased content value (since they may justifiably claim a discount over lower value and lower volume publishers). Low value, low volume publishers pay the bureau the greatest percentage of their revenue (since they represent the least value to the bureau and take the least advantage of the bureau's in-built economies of scale). Low value but high volume publishers pay the bureau intermediate percentages of revenues since the bureau can take advantage of its in-built economies of scale to limit the cost of supporting these revenue volumes. Finally, high value but low volume publishers pay the bureau intermediate percentages of revenues since they represent minimal load on the DRM servers. To simplify the calculations, the formula for percentage of revenue may be based on discrete bands of values for published content value and purchase volume rather than continuous values.

Figure 13:
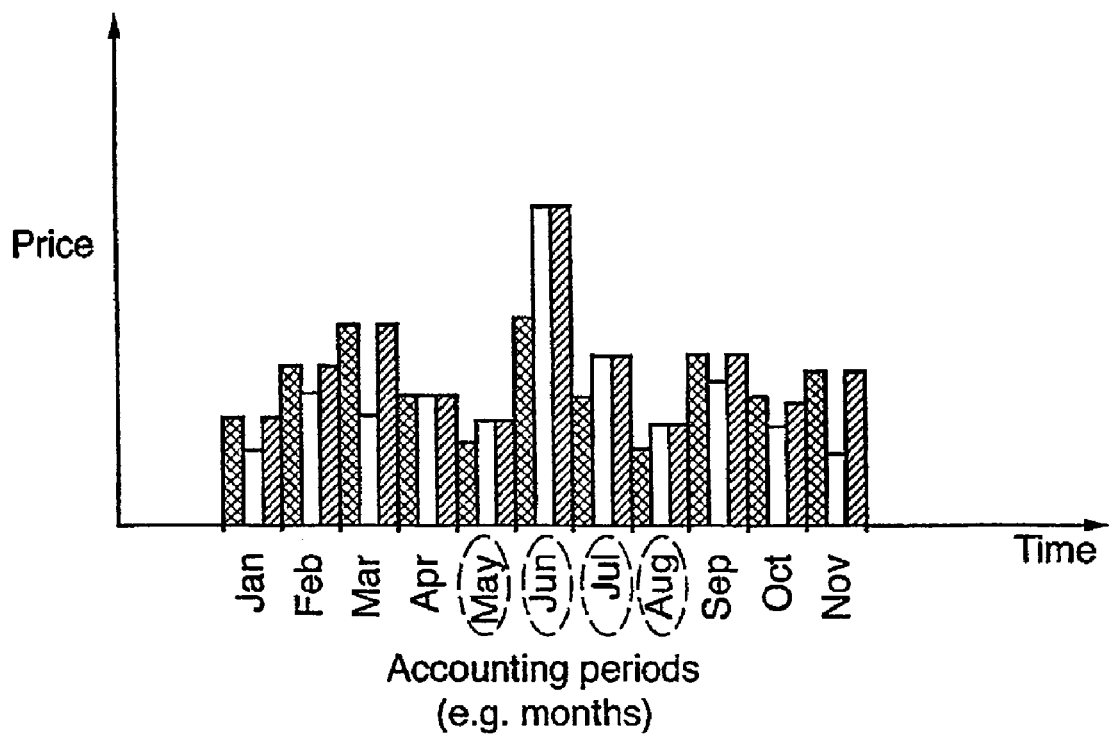
FIG. 13 illustrates schematically an example of revenue-based pricing, with a load-based floor, for use of a DRM bureau service.

It is recognised that some publishers may charge consumers in an indirect fashion (e.g. via an "offline" subscription) while maintaining a nominal charge via the bureau. For this and other reasons, the DRAM bureau can impose a load-based floor to the revenue-based pricing method, as illustrated schematically in FIG. 13. According to this pricing method, if the publisher fee due to the bureau service as calculated from the load-based pricing method exceeds the fee calculated from the revenue-based pricing method (taking into account the duration of purchased rights), then the load-based fee takes precedence. In the FIG. 13 example, in May, June, July and August the publisher fee due to the bureau service as calculated from the load-based pricing method exceeds the fee calculated from the revenue-based pricing method. Thus, in these months, the load-based pricing method takes precedence. The load-based pricing floor avoids the pathological situation where the bureau does not generate sufficient revenues to cover its infrastructure and operational costs.

Bureau Affiliate Programme

Figure 14:
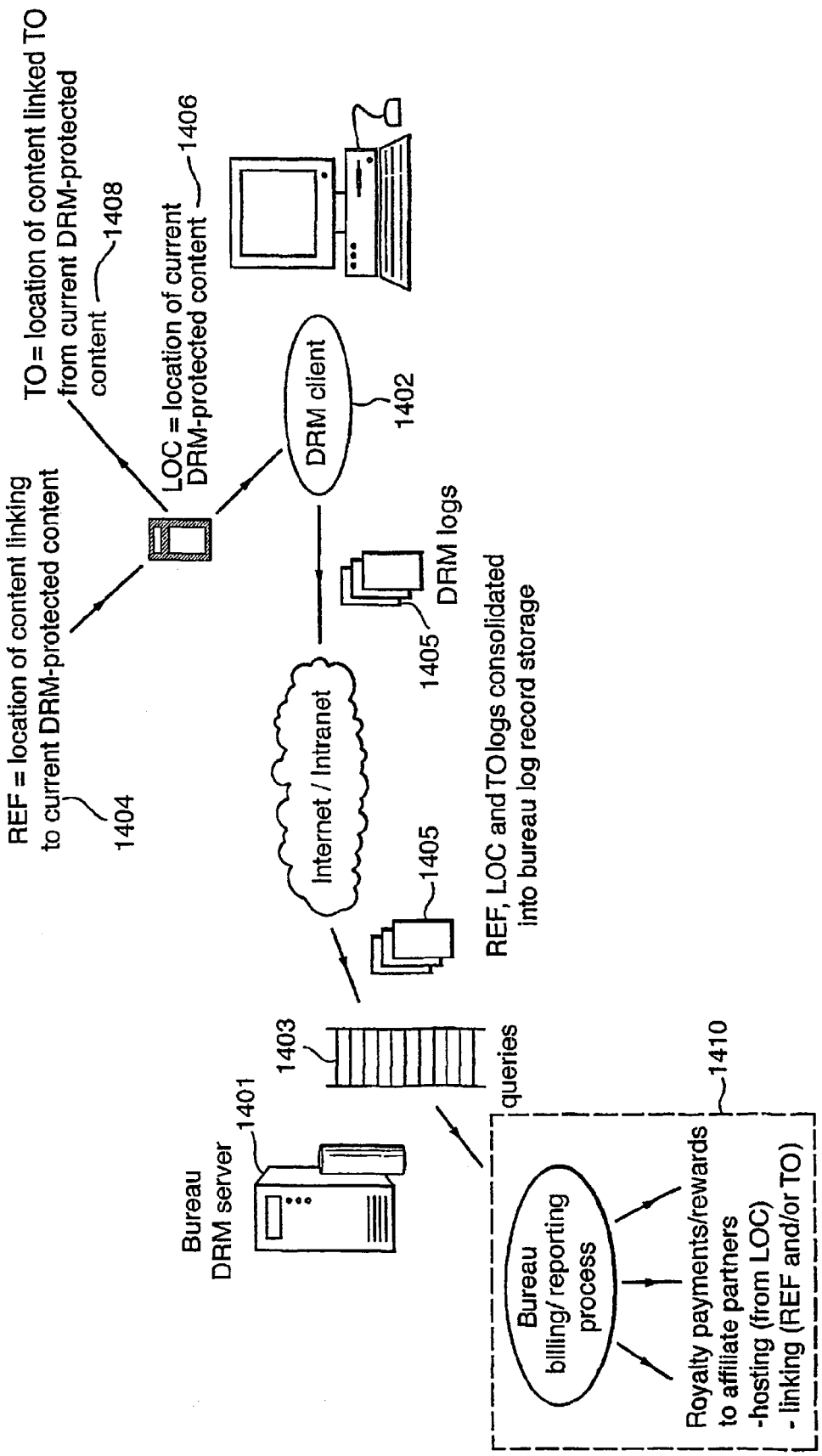
FIG. 14 illustrates schematically an example of a logging based bureau affiliate program; and, FIG. 15 illustrates schematically an example of "roaming" between DRM bureaux.

FIG. 14 illustrates schematically a logging-based bureau affiliate programme. Basically, client-side logging information 1405 is sent from the DRM clients 1402 (on remote consumer devices) to the bureau server 1401 for consolidation into a centralised bureau DRM audit trail 1403. Specifically, each participating DRM client 1402 records the "location" from which a given consumer accesses DRM-protected content. This may be, for example, a location on a computer's local file system, a shared network drive, a Web server on the Internet or a corporate intranet, etc.

DRM clients can log a number of important "locations", including for example REF 1404, the location of the prior content that led, linked or referred to the current content; LOC 1406, the location of the current content; and, TO 1408, the location of the next content to which the consumer goes from the current content.

This information is then used by the bureau 1101 to operate an affiliate program 1410 whereby affiliate partners are rewarded (financially or otherwise) for one or more of: linking to DRM-encrypted content (derived from the REF record 1404); hosting DRM-encrypted content (derived from the LOC record 1406); and, linking from DRM-encrypted content (derived from the TO record 1408).

Advantages of such an affiliate program 1410, enabled by the unique capabilities of the DRM client to provide feedback on downstream consumption of digital content, include for example: providing publishers with an auditable mechanism for giving partners incentives to host, distribute and link to the publisher's content; and, providing conventional retail channels with new, meaningful and commercially viable roles in the digital publishing future (whereas digital publishing has typically been viewed as a threat to conventional retail operations).

Plural DRM Bureaux

After DRM technologies and DRM-based bureau services are widely adopted, it is expected that there will soon be a number of DRM bureau services distributed throughout the world, for example because the original DRM bureau service has been franchised to third parties so that it may be specialised for horizontal market segments (e.g. language groupings) or vertical market segments (such as specific media types or applications). In the short term, in order to consume content from different publishers, when those publishers are served by different DRM bureau services, the consumer will need to hold a separate consumer account with each bureau service. This is inconvenient since the consumer needs to authenticate herself to multiple bureaux (and would therefore typically need to manage multiple usernames and passwords) and receives separate statements and bills from each bureau.

FIG. 15 illustrates schematically a system of plural DRM bureaux (only two DRM bureaux 1502 and 1504 being shown for simplicity), connected by a "gateway" 1506 via which a subscriber to one DRM bureau can access content whose rights are controlled by another bureau. Thus, the client-side DRM software is capable of interoperating with the DRM servers behind each of the disparate bureau services.

Furthermore, a primary consumer account can "roam" between bureaux in much the same way that a mobile telephone user can roam internationally, i.e. the user can consume content managed by other bureaux with which a primary bureau has established cross-charging relationships, authenticating themselves to the primary bureau account via the other bureau and receiving consolidated statements and bills from the primary bureau.

Embodiments of the present invention have been described with particular reference to the examples illustrated. However, it will be appreciated that variations and modifications may be made to the examples described within the scope of the present invention. Furthermore, the claims that follow relate entirely or principally to systems (i.e. typically apparatus). It will be appreciated that corresponding methods are also within the scope of the present invention.

The invention claimed is:

1. A digital rights management (DRM) system for managing a consumer's access to DRM encrypted content through a DRM client of the consumer, the DRM system comprising:

at least one DRM server programmed to validate an identity of a consumer and send a first copy of at least one access right for DRM encrypted content, the at least one access right comprising electronic information to be implemented by the DRM client of the consumer to enable the consumer to decrypt and access the DRM encrypted content independently of the at least one DRM server, the first copy to be stored at the DRM client of the consumer, the at least one DRM server being further programmed to store a second copy of the at least one access right that is accessible to the at least one DRM server, wherein, upon receiving a request for engaging in a transaction with a specified DRM client of the consumer such that the consumer is able to decrypt and access the encrypted content using the at least one access right, the at least one DRM server is further programmed to:

determine whether the specified DRM client is storing the first copy of the at least one access right;

where the specified DRM client is not storing the first copy of the at least one access right, access the second copy of the at least one access right;

determine whether a criterion of the DRM content prevents the consumer from being granted access to the DRM encrypted content at substantially the time of the request; and where the criterion of the DRM content allows the consumer to access the DRM encrypted content, allow the consumer to use the second copy of the access right to access and decrypt the DRM encrypted content using the DRM client.

2. A system according to claim 1, wherein the DRM server is arranged to store the second copy of the at least one access right for a predetermined time before being made void.

3. A system according to claim 2, wherein the DRM server is further programmed to void the at least one access right upon a voiding criterion being satisfied.

4. A system according to claim 1, wherein the DRM server is arranged so that the first copy of the at least one access right checked out to said consumer DRM client is not identical to the second copy of the at least one access right stored by the DRM server.

5. A system according to claim 1, wherein the DRM server is further programmed to send a third copy of the at least one access right to the DRM client when the second copy is stored by the DRM server but the first copy is lost or otherwise inaccessible to said consumer DRM client.

6. A method in a digital rights management (DRM) system of managing a consumers access to DRM encrypted content through a DRM client of the consumer, the method comprising:

a DRM server programmed to engage in a transaction with a specified DRM client of the consumer such that the transaction results in the consumer being granted at least one access right to the DRM encrypted content, the at least one access right comprising electronic information to be implemented by the DRM client of the consumer to enable the consumer to decrypt and access the DRM encrypted content independently of the at least one DRM server, the DRM server checking out a first copy of the at least one access right to be stored at the DRM client of the consumer, and storing a second copy of the at least one access right that is accessible to the DRM server, wherein, upon receiving a request from the consumer to decrypt and access the DRM encrypted content through the specified DRM client, the DRM server is further programmed to:

determine whether the specified DRM client is storing the first copy of the at least one access right;

where the specified DRM client is not storing the first copy of the at least one access right, access the second copy of the at least one access right for the DRM client;

determine whether a criterion of the DRM content prevents the consumer from being granted access to the DRM encrypted content at substantially the time of the request; and where the criterion of the DRM content allows the consumer to access the DRM encrypted content, allow the consumer to use the second copy of the access right to access and decrypt the DRM encrypted content using the DRM client.

7. A method according to claim 6, wherein the DRM server allows the second copy of the at least one access right to be stored for a predetermined time before being made void.

8. A method according to claim 7, wherein the DRM server is further programmed to void the at least one access right upon a voiding criterion being satisfied.

9. A method according to claim 6, wherein the first copy of the at least one access right that is checked out to said consumer DRM client is not identical to the second copy of the at least one access right stored by the DRM server.

10. A method according to claim 6, wherein the DRM server is further programmed to send a third copy of the at least one access right to the consumer DRM client in the event that the second copy is stored by the DRM server but the first copy of said at least one access right is lost or otherwise inaccessible to the consumer DRM client.

* * * * *